(12) United States Patent
Hench et al.

(10) Patent No.: US 10,801,465 B2
(45) Date of Patent: Oct. 13, 2020

(54) SYSTEM AND METHOD FOR GENERATED POWER FROM WAVE ACTION

(71) Applicant: Leidos, Inc., Reston, VA (US)

(72) Inventors: Steven C. Hench, Annapolis, MD (US); Charles R. Fralick, Ashburn, VA (US)

(73) Assignee: Leidos, Inc., Reston, VA (US)

( * ) Notice: Subject to any disclaimer, the term of this patent is extended or adjusted under 35 U.S.C. 154(b) by 588 days.

(21) Appl. No.: 15/375,255

(22) Filed: Dec. 12, 2016

(65) Prior Publication Data
US 2017/0298898 A1 Oct. 19, 2017

Related U.S. Application Data

(62) Division of application No. 14/506,016, filed on Oct. 3, 2014, now Pat. No. 9,528,491, which is a division of application No. 13/453,761, filed on Apr. 23, 2012, now Pat. No. 8,866,328.

(60) Provisional application No. 61/494,114, filed on Jun. 7, 2011.

(51) Int. Cl.
*F03B 13/20* (2006.01)
*E02B 9/08* (2006.01)
*F15B 11/08* (2006.01)

(52) U.S. Cl.
CPC ............... *F03B 13/20* (2013.01); *E02B 9/08* (2013.01); *F15B 11/08* (2013.01); *F05B 2240/93* (2013.01); *F05B 2260/406* (2013.01); *F15B 2211/2053* (2013.01); *F15B 2211/7058* (2013.01); *Y02E 10/38* (2013.01)

(58) Field of Classification Search
CPC ........ E02B 9/08; F03B 13/20; F05B 2240/93; F05B 2260/406; F15B 11/08; F15B 2211/2053; F15B 2211/7058; Y02E 10/38
See application file for complete search history.

(56) References Cited

U.S. PATENT DOCUMENTS

| | | | |
|---|---|---|---|
| 1,220,618 A | 3/1917 | Fisher | |
| 1,502,511 A | 7/1924 | Marvin | |
| 2,990,803 A | 7/1961 | Henderson | 114/230 |
| 3,001,371 A | 9/1961 | Gilmore, Jr. et al. | 61/48 |
| 3,070,061 A | 12/1962 | Rightmayer | 115/34 |
| 3,231,749 A | 1/1966 | Hink, III | 290/53 |
| 3,654,807 A | 4/1972 | Deskey | 73/180 |
| 3,691,573 A | 9/1972 | Laudato, Jr. | 441/16 |
| 3,763,703 A | 10/1973 | Man | 73/182 |
| 3,800,128 A | 3/1974 | Kurk | 701/21 |
| 3,814,910 A | 6/1974 | Palmieri et al. | 701/21 |

(Continued)

*Primary Examiner* — Abiy Teka
(74) *Attorney, Agent, or Firm* — Dawn-Marie Bey; Bey & Cotropia PLLC

(57) ABSTRACT

Wave energy conversion systems are provided utilizing a mass of water entrained in a collapsible water mass enclosure that is suspended beneath a float (e.g., a vehicle, buoy, platform, etc.) to provide an inertial force in opposition to the rising heave-induced acceleration of the float. The water mass enclosure is communication with a generator, such as by tethering one end of a tethering means to the generator and the other to the enclosure. The enclosure may be placed in communication with an intermediary hydraulic system, which is also in communication with the generator. In certain embodiments, the system will include a reel system for deploying and retrieving the water masse enclosure.

3 Claims, 17 Drawing Sheets

(56) References Cited

U.S. PATENT DOCUMENTS

| | | | |
|---|---|---|---|
| 3,875,388 A | 4/1975 | Luten et al. | 701/21 |
| 3,881,094 A | 4/1975 | Taylor et al. | 701/21 |
| 3,881,095 A | 4/1975 | Taylor et al. | 701/21 |
| 3,968,353 A | 7/1976 | Kuller | 701/21 |
| 4,110,630 A | 8/1978 | Hendel | 290/53 |
| 4,168,556 A | 9/1979 | Fink et al. | 114/264 |
| 4,258,270 A * | 3/1981 | Tornkvist | F03B 13/1815 290/53 |
| 4,266,143 A | 5/1981 | Ng | 290/53 |
| 4,317,047 A | 2/1982 | de Almada | 290/53 |
| 4,340,821 A | 7/1982 | Slonim | 290/53 |
| 4,340,936 A | 7/1982 | Mounce | 701/200 |
| 4,352,023 A | 9/1982 | Sachs et al. | 290/42 |
| 4,405,866 A | 9/1983 | Mosuda et al. | 290/53 |
| 4,423,334 A | 12/1983 | Jacobi et al. | 290/53 |
| 4,438,343 A | 3/1984 | Marken | 290/53 |
| 4,490,621 A | 12/1984 | Watabe et al. | 290/52 |
| 4,527,951 A | 7/1985 | Trier | 416/145 |
| 4,531,063 A | 7/1985 | Vielmo et al. | 290/53 |
| 4,549,267 A | 10/1985 | Drabouski, Jr. | 701/124 |
| 4,631,921 A | 12/1986 | Linderfelt | 60/501 |
| 4,674,324 A | 6/1987 | Benoit | 73/65.03 |
| 4,708,592 A | 11/1987 | Krolick et al. | 416/176 A |
| 4,748,338 A | 5/1988 | Boyce | 290/52 |
| 4,781,023 A * | 11/1988 | Gordon | F03B 13/20 290/42 |
| 4,785,404 A | 11/1988 | Sims et al. | 701/200 |
| 4,842,560 A | 6/1989 | Lee | 440/9 |
| 4,843,250 A | 6/1989 | Stupakis | 290/53 |
| 4,851,704 A | 7/1989 | Rubi | 290/53 |
| 4,872,118 A | 10/1989 | Naidenov et al. | 701/124 |
| 4,954,110 A | 9/1990 | Warnan | 441/22 |
| 5,048,356 A | 9/1991 | Levko | 74/60 |
| 5,268,881 A | 12/1993 | Damm | 368/134 |
| 5,341,757 A | 8/1994 | Digiacomo | 114/230.27 |
| 5,411,422 A | 5/1995 | Robertson | 440/48 |
| 5,424,582 A | 6/1995 | Trepl, II et al. | 290/53 |
| 5,452,216 A | 9/1995 | Mounce | 701/214 |
| 5,460,099 A | 10/1995 | Matsuhisa et al. | 105/148 |
| 5,499,889 A | 3/1996 | Yim | 405/76 |
| 5,608,160 A | 3/1997 | Chastonay | 73/65.03 |
| 5,696,413 A | 12/1997 | Woodbridge et al. | 310/15 |
| 5,770,893 A | 6/1998 | Youlton | 290/53 |
| 5,789,826 A | 8/1998 | Kumbatovic | 290/53 |
| 5,908,122 A | 6/1999 | Robinett et al. | 212/275 |
| 5,924,845 A | 7/1999 | Bagley et al. | 416/145 |
| 5,929,531 A | 7/1999 | Lagno | 290/53 |
| 6,020,653 A | 2/2000 | Woodbridge et al. | 290/53 |
| 6,106,411 A | 8/2000 | Edwards | 473/292 |
| 6,216,625 B1 | 4/2001 | Baluha | 114/230.27 |
| 6,308,649 B1 | 10/2001 | Gedeon | 114/39.11 |
| 6,441,516 B1 | 8/2002 | Kaelin et al. | 310/36 |
| 6,616,402 B2 | 9/2003 | Selsam | 415/3.1 |
| 6,647,716 B2 | 11/2003 | Boyd | 60/398 |
| 6,681,572 B2 | 1/2004 | Flory | 60/507 |
| 6,823,810 B2 | 11/2004 | Carlson et al. | 114/125 |
| 6,833,631 B2 | 12/2004 | Van Breems | 290/42 |
| 6,864,614 B2 | 3/2005 | Murray | 310/216 |
| 6,994,047 B1 | 2/2006 | Pent, III | 114/230.27 |
| 7,042,110 B2 | 5/2006 | Mikhail et al. | 290/44 |
| 7,105,939 B2 | 9/2006 | Bednyak | 290/42 |
| 7,143,363 B1 | 11/2006 | Gaynor et al. | 715/771 |
| 7,199,481 B2 | 4/2007 | Hirsch | 290/42 |
| 7,239,038 B1 | 7/2007 | Zimmerman et al. | 290/54 |
| 7,298,054 B2 | 11/2007 | Hirsch | 290/42 |
| 7,362,004 B2 | 4/2008 | Becker | 290/55 |
| 7,375,436 B1 | 4/2008 | Goldin | 290/42 |
| 7,436,082 B2 | 10/2008 | Ruse et al. | 290/42 |
| 7,440,848 B2 | 10/2008 | Anderson | 701/207 |
| 7,453,165 B2 | 11/2008 | Hench | 290/53 |
| 7,538,445 B2 | 5/2009 | Kornbluh et al. | 290/53 |
| 7,557,456 B2 | 7/2009 | Kornbluh et al. | 290/42 |
| 7,625,255 B2 | 12/2009 | Ide et al. | 440/88 M |
| 7,629,704 B2 | 12/2009 | Hench | 290/53 |
| 7,649,276 B2 | 1/2010 | Kornbluh et al. | 290/53 |
| 8,564,150 B2 | 10/2013 | Shpinev | 290/53 |
| 2001/0000197 A1 | 4/2001 | Gorlov | 114/274 |
| 2003/0173922 A1 | 9/2003 | Pelonis | 318/439 |
| 2004/0046474 A1 | 3/2004 | Kalsi | 310/179 |
| 2004/0239199 A1 | 12/2004 | Qu et al. | 310/114 |
| 2005/0285407 A1 | 12/2005 | Davis et al. | 290/54 |
| 2007/0137195 A1 | 6/2007 | Tayla et al. | 60/397 |
| 2007/0138793 A1 | 6/2007 | Zimmerman et al. | 290/1 R |
| 2007/0251230 A1 | 11/2007 | Zimmerman et al. | 60/497 |
| 2008/0054639 A1 | 3/2008 | Maier et al. | 290/40 R |
| 2008/0093858 A1 | 4/2008 | Hench | 290/53 |
| 2008/0206077 A1 * | 8/2008 | Royset | E02B 9/08 417/333 |
| 2008/0224472 A1 | 9/2008 | Bean | 290/42 |
| 2008/0265582 A1 | 10/2008 | Hench | 290/53 |
| 2009/0008942 A1 | 1/2009 | Clement et al. | 290/53 |
| 2009/0127856 A1 | 5/2009 | Hench | 290/42 |
| 2009/0160191 A1 | 6/2009 | Beane | 290/53 |
| 2010/0072752 A1 | 3/2010 | Park et al. | 290/52 |
| 2010/0123315 A1 | 5/2010 | Anderson, Jr. | 290/53 |
| 2010/0148512 A1 | 6/2010 | Pitre | 290/54 |
| 2011/0012358 A1 | 1/2011 | Brewster et al. | 290/53 |
| 2011/0278847 A1 | 11/2011 | Hench et al. | 290/53 |

* cited by examiner

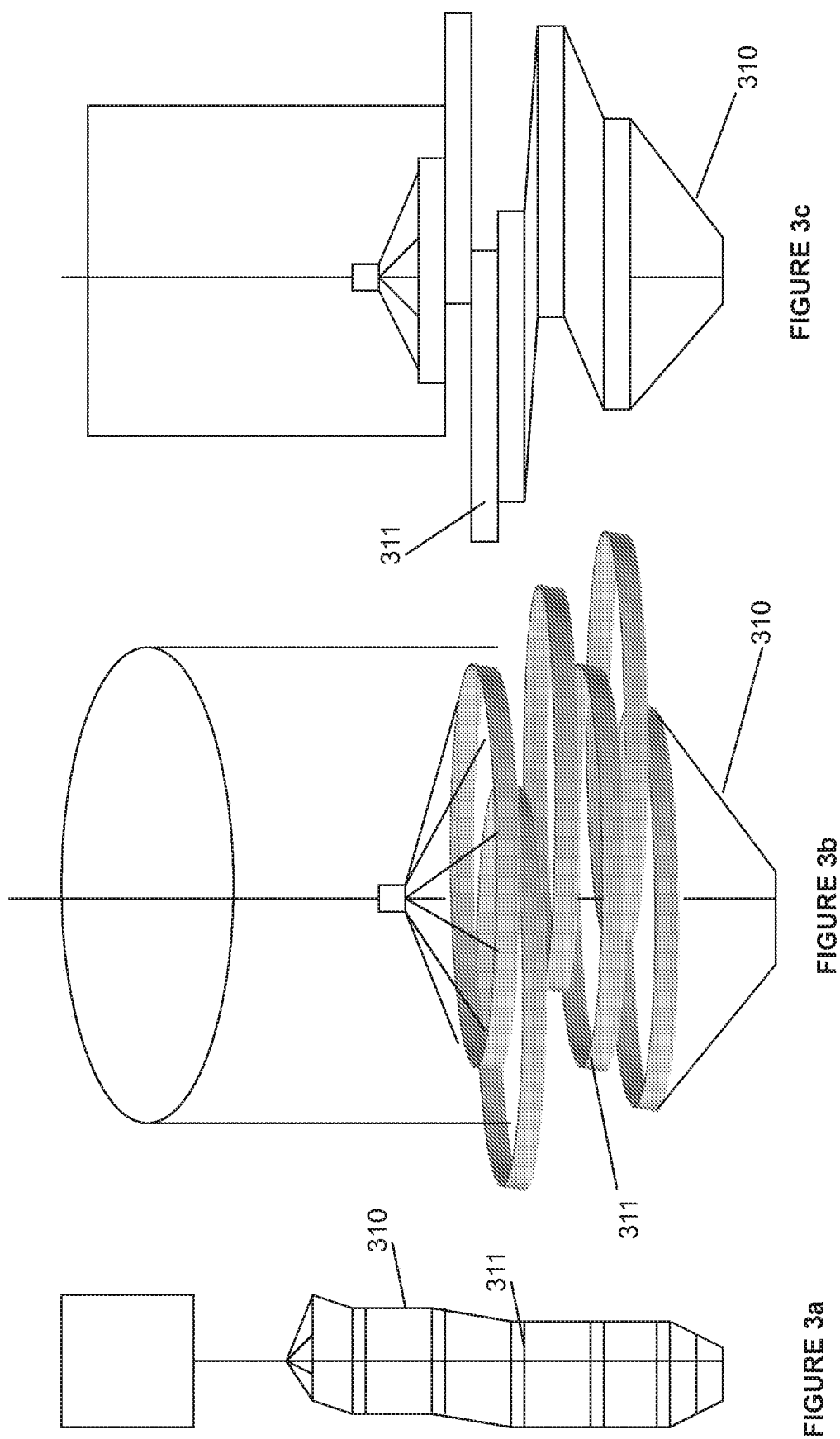

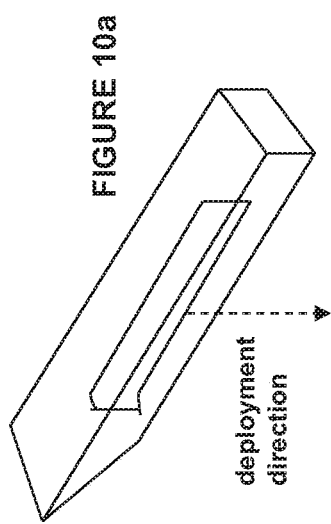
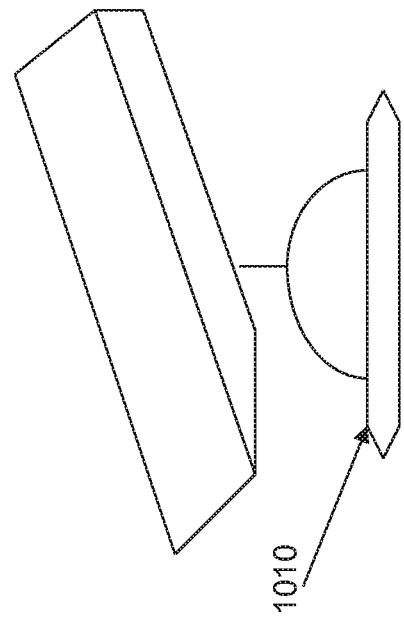
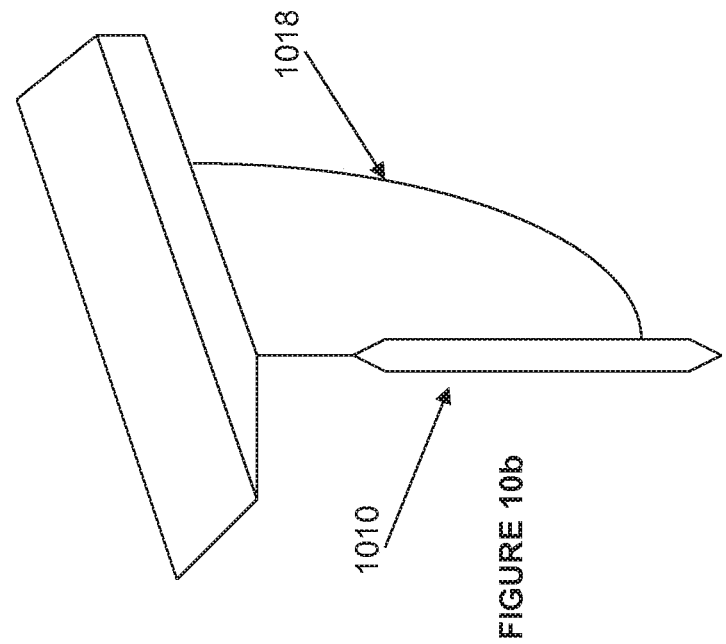

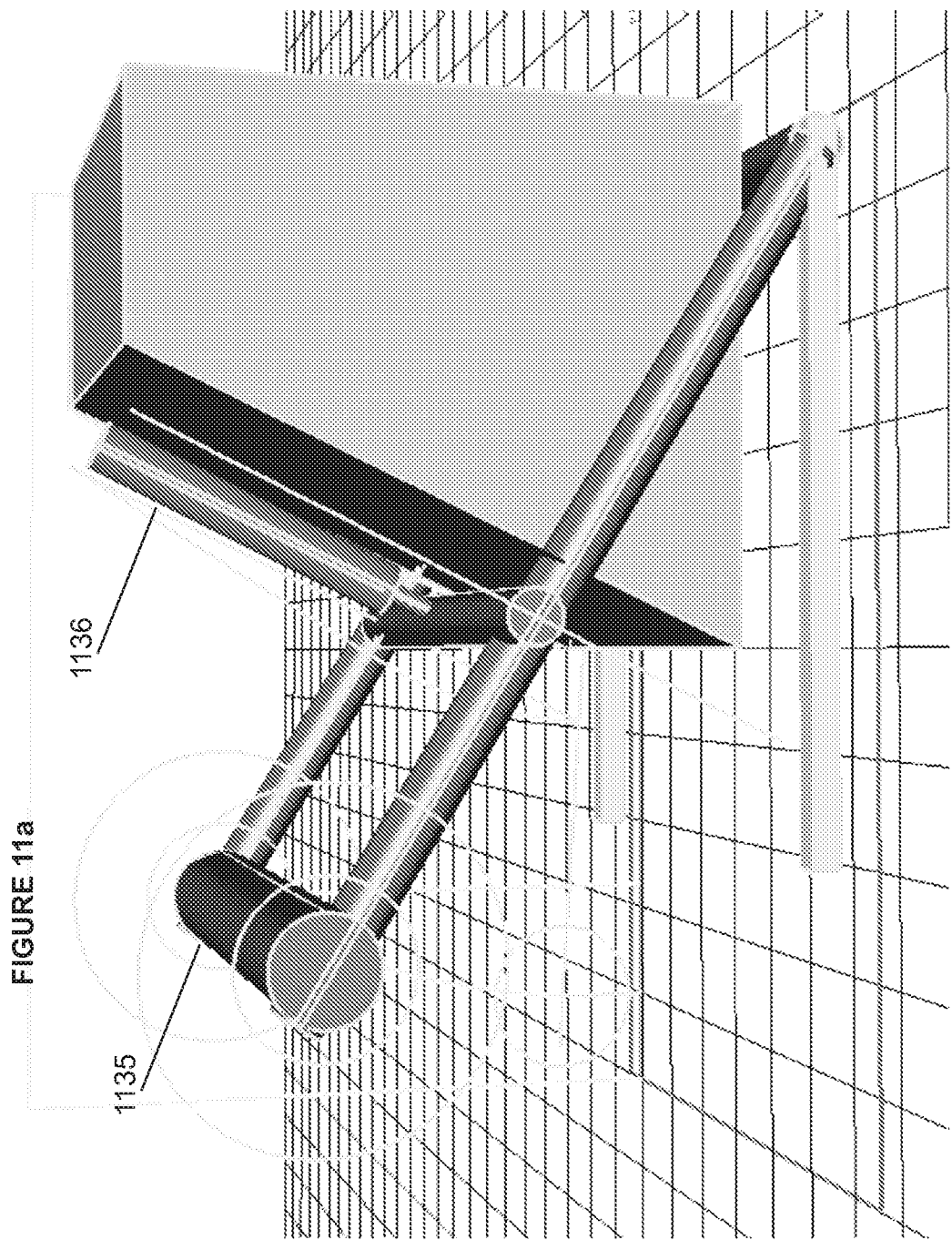

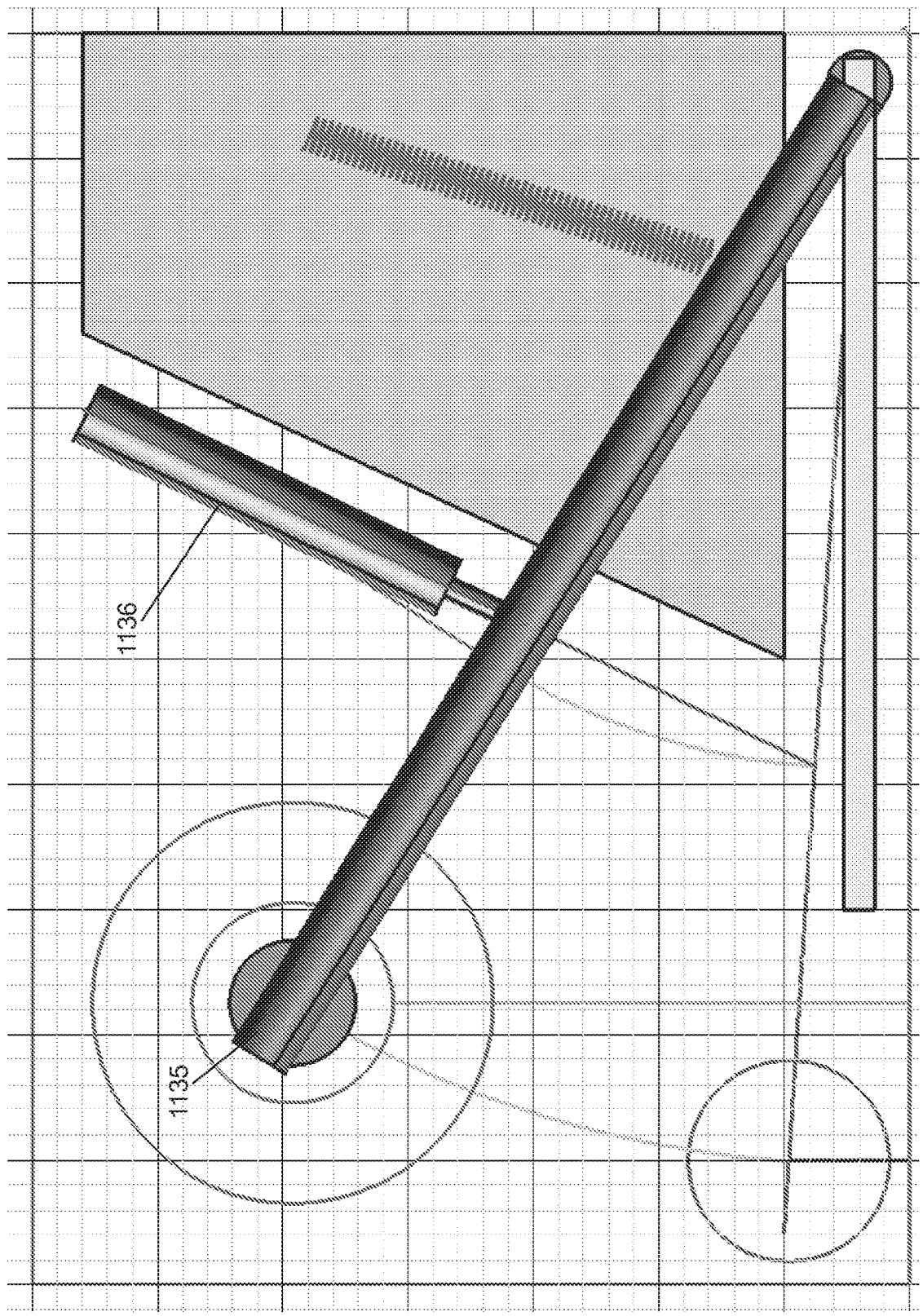

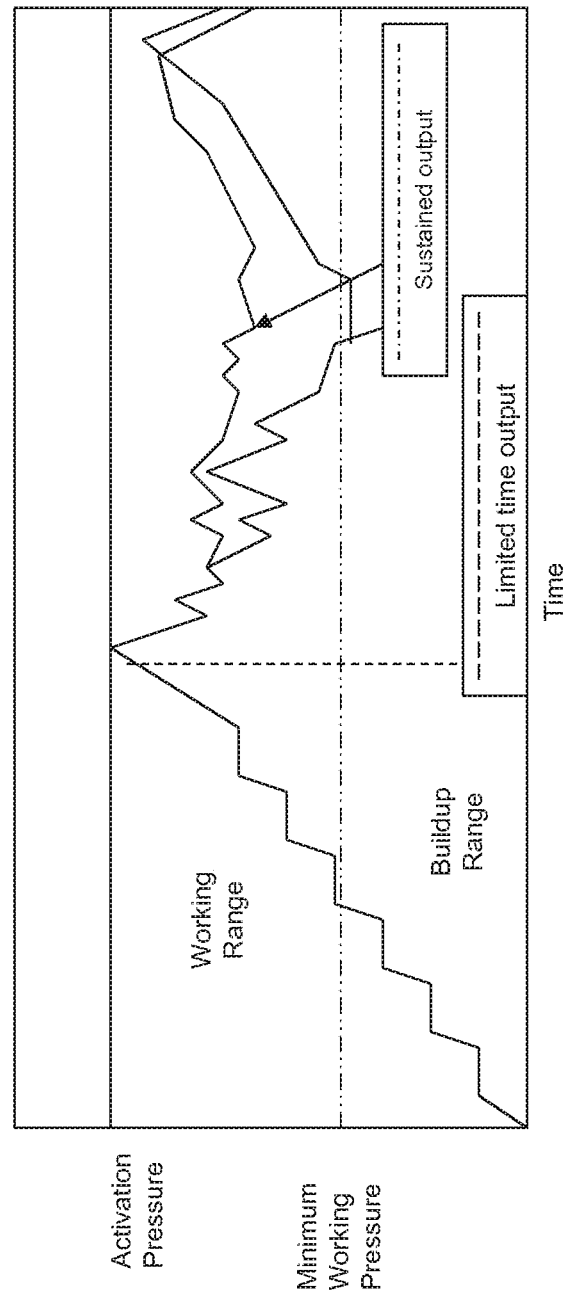

SYSTEM AND METHOD FOR GENERATED POWER FROM WAVE ACTION

CROSS-REFERENCE TO RELATED APPLICATIONS

The present application is a division of U.S. patent application Ser. No. 14/506,016, filed Oct. 3, 2014, titled "System and Method For Generated Power From Wave Action," which is a division U.S. patent application Ser. No. 13/453,761, filed Apr. 23, 2012, titled "System and Method For Generated Power From Wave Action," which claims benefit of similarly titled U.S. Provisional Patent Application Ser. No. 61/494,114, filed on Jun. 7, 2011, all of which are incorporated herein by reference in their entirety.

STATEMENT REGARDING FEDERALLY SPONSORED DEVELOPMENT

This invention was made with Government support under contract no. 08-31 awarded by the Defense Advanced Research Projects Agency (DARPA). The Government may have certain rights in the invention.

BACKGROUND

Wave energy is among the many alternative energy production methods that have been the subject of intensified research in recent years. A concern about diminishing fossil fuel supplies, as well as global climate change, has added impetus to this activity, resulting in many successful demonstrations of wave energy capture (WEC).

One area where WEC may be employed is in powering unmanned maritime systems, including distributed sensing systems, unmanned maritime vehicles (UMVs) (both surface and submersible), and near-shore logistics systems. These systems are heavily influenced by three primary criteria: mission capability, endurance, and available power. Increases in capability and endurance create a demand for more power, and thus any technology that increases available power is desirable. To date, energy sources include fossil fuels or other energetic chemical fuels (hydrogen, ammonia, etc.), metal-water reactions, batteries, and photovoltaics. Chemical fuels require large volume and increase the mass of the vessel early in the mission, followed by a need to ballast with deadweight later on in the mission, which is detrimental to fuel efficiency. Primary and secondary storage batteries are limited in their energy density and there is no large leap in capacity envisioned. Photovoltaics provide some relief, but require a proportional amount of surface area, work optimally only during clear daytime conditions, and are affected by latitude and season.

An available source of energy for marine systems comes from the seas they encounter, either while cruising, station keeping, or drifting. Ocean waves and swells are created by a variety of physical processes. The ocean waves and swells of interest for the embodiments described herein are generally those generated by wind forcing, but can be from any forcing mechanism producing the amplitude (height) necessary to allow harvesting. Waves differ from one another and from time to time not only in terms of their height, as measured from peak to trough, but also by their shape and period (length). Wave shapes run in a continuum ranging from long sinusoidal swells to steep and trochoidal with well-defined peaks. The average kinetic energy of waves is significant, but a practical means of harnessing it aboard a free-floating vessel, other than for very low-speed propulsion (e.g., flapping fins), has not been realized. The devices described herein are low in both dry mass and volume, able to be deployed and retrieved repeatedly and on demand, and able to harvest enough ocean energy to support continuous operations for relatively long periods of time (e.g., months).

Wave kinetic energy is manifested by the rising and falling of the volume of water contained in the wave as it propagates through the ocean. In theory, a vessel should be able to harvest some portion of the wave energy impinging upon it. To do this, the wave must be absorbed without being simply reflected. Harvesting ocean wave energy requires that some means be used to cause the wave to exert a force against some type of mechanical actuator, which can perform useful work. In most cases, the end work product is electrical current, produced by a generator (or alternator).

Conventional WEC devices require moving parts, are exposed to the biological and chemical processes of marine fouling, and are exposed to extremes of mechanical stress. These factors, when taken together, pose numerous engineering challenges and unique solutions. Wave energy as a viable commercial power source will require large numbers of highly reliable devices to be deployed and maintained in a hostile environment at a minimum cost. For naval applications, there are transition opportunities for wave energy that are cost-effective, notably as a power source for buoys and UUVs and other remote applications where energy storage density limits endurance.

To understand why wave energy should be considered as an attractive source of power for ocean vehicles, a comparison may be made to other forms of environmental energy, namely wind and solar. These forms of energy can be expressed in terms of their density per square meter as a raw value in Watts. An alternative energy capture device converts some fraction of this raw energy into harvested output. The captured energy is ultimately used directly, stored (usually in secondary batteries) or shed depending on demand.

The raw energy of wind is a function of the density of air and its velocity, in the general form $$P(\text{wind}) = 0.5 * \rho A V^3$$

where
P is the power in Watts;
$\rho$ is the density of air (about 1.2 kg/m3);
A is the area in square meters;
and V is velocity in meters/sec.

Most wind energy devices operate at 25-45% efficiency. The theoretical maximum, known as Betz's law, is 59.3%. However, wind devices are not attractive as sources of energy for many offshore missions due to high visibility, vulnerability to wave damage, variability of winds, and potential hazards to humans and marine life.

Solar energy, at noon at the equator, provides total energy flux of about 1300 Watts/m$^2$. The overall clear-sky daylight power level depends on the angle of the sun relative to that of the collector, expressed as $$P(\text{solar}) = 1300 * \sin \theta,$$

where
P is power in Watts, and
$\theta$ is the sun angle, with 90° being directly overhead.

Solar angle changes with time of day, season, and vessel motion. Typical solar panels operate at 15-30% efficiency under ideal conditions. Any type of cloud cover, precipitation, and obscuration greatly reduces the instantaneous solar irradiance value. In addition, solar collector efficiency can be rapidly degraded in the marine environment due to biological fouling (e.g., birds or algae). At the equator, the RMS value of cloudless daytime solar irradiance will be 800 Watts per square meter. Therefore, one square meter of solar panels operating at 25% efficiency at the equator delivers 2400 Watt-hours of total power per day—a mean power of 100 Watts, and a storage requirement of 1200 watt-hours (12 kg of lithium-ion batteries) for continuous nighttime operation. Installation constraints can also significantly reduce solar efficiency.

Wave energy is the amount of energy present in the rising and falling water mass of passing waves. The available power is $$P(\text{wave}) = 0.5 * T * h^2$$

where
P is power in
Kilowatts,
T is the wave period in seconds, and
h is the height of the wave (trough to crest) in meters.

For example, a wave 1 meter in height having a period of 5 seconds contains 2.5 kilowatts of power per linear meter of wave front. This wave energy can propagate for very long distances before slowly dissipating in the open sea or against some object such as a coastline. By comparison, wave energy is more ubiquitous and dependable than wind energy, because WEC devices can operate using swells and are not reliant on wind driven seas. Wave energy devices typically operate at 10-25% efficiency. Thus, during a 24-hour period in a 1-meter, 5-second sea, using a vessel hull of 1 square meter, a wave energy conversion device operating at 10% efficiency delivers 6000 Watt-hours of total energy—an output power of 250 Watts, day and night. As a general rule of thumb, wave power per square meter of sea surface becomes greater than solar (neglecting clouds and latitude) when the wave height exceeds about 0.5 m. Statistically, global wave heights average greater than 0.5 m, but vary considerably with ocean and region.

One important commonality shared by wind and wave energy is that they do not have an upper bound in the same way that solar does. As wind speed increases, the energy impinging on a collection device increases with the cube of the wind velocity, or a factor of eight for each doubling in speed. Wave energy increases by a factor of about 32 for each doubling of wave period. The importance of this is that wind and wave collectors must be designed to operate under some minimum conditions and be able to safely shed energy to avoid destruction above some upper limit.

Because solar and wave energy are not mutually exclusive, it is possible that both sources may be utilized on the same vessel. Thus, on a sunny day, under the conditions described above a vessel could have 7440 Watt-hours of energy available for real time work and battery charging; enough for significant mobility and payload operations.

Critical insights on how to best harness wave energy can be gained by considering an idealized sinusoidal sea. The well-known form of the amplitude of the free surface sine wave is:

$$Y = \frac{h}{2} * \sin(bt)$$

where
Y=y-axis position of the wave surface at time t
h=height of the wave (divided by 2 because h is conventionally the trough to crest distance)
b=2*λ/T, (T being the period in seconds)
t=time Vertical velocity is the first derivative:

$$Y' = \frac{h}{2} * b * \cos(bt)$$

Devices that attempt to harvest wave energy by utilizing drag via the use of underwater plates must obey the drag force equation:

$$F = 0.5 \rho A (Y')^2 * C,$$

where
ρ=density of seawater (~1030 kg/m³)
A=the Area of the plate in square meters, and
C=a drag coefficient for the shape (assume 1 for a flat plate).

Due to the presence of velocity (Y') squared in this equation, small changes in velocity lead to large changes in force. This fact, coupled with the unbounded nature of velocity as a function of wave height, means that the forces acting on a plate of a given size (area) vary greatly. A plate with sufficient area to harvest energy from small waves, and hence small velocities, must be large in area. This has major implications when it comes to the design of a practical velocity-driven wave energy capture device.

Vertical acceleration is the second derivative:

$$Y'' = \frac{h}{2} * b^2 * [-\sin(bt)]$$

$$V_{MAX} = Y'_{MAX} = \frac{h}{2} * b, \text{ and}$$

$$\text{Max\_Accel} = Y''_{MAX} = \frac{h}{2} * b^2 = Y' * b.$$

Note that when T is small, b becomes larger. FIG. 1 shows these time series for sinusoidal waves of two different heights. As used herein, waves have the same "shape" if their ratio of height to wavelength is the same. Wavelength of an ocean gravity wave is given by:

$$L = \frac{gT^2}{2\pi}$$

Therefore, if constant h/L defines waves of the same shape, so does constant h/T².

Waves of the same shape have very similar acceleration values (exactly equal in the case of sinusoidal waves). For example, for a 1-meter wave of period 5 seconds,
L=39m
VMax=0.63 m/s², and
Max_Accel=$V_{MAX}$*b=0.79 m/s².

A 0.2-meter wave of the same shape has T=2.23 sec and
L=7.8 m
VMax=0.28 m/s, and again
Max_Accel=$V_{MAX}$*b=0.79/s².

A wave's vertical acceleration is more tightly bounded than velocity, therefore making it more straightforward to design devices to efficiently exploit acceleration than velocity. Wave shapes will vary but are bounded by h/L=1/7, at which point waves are generally observed to break. A sinusoidal wave of this limiting shape will have Max_Accel=4.4 m/s². This is important to present embodiments when wind is local, as short period steep waves will produce larger acceleration forces.

The majority of existing WEC devices cannot function without mooring to provide a reaction force. WEC devices that can function while drifting can be categorized in terms of their wave coupling modality: flexural; oscillatory/resonant; angle rate and surge; and pure heave. Examples include the Pelamis system (www.pelamiswave.com), which is a very large flexural device. In this system, a spatially differentiated heave causes a long chain of spars to deflect, and energy is extracted at the spar connection points. A disadvantage of this device is that it is sensitive to orientation—it must be pointed into the seas to function. It would be inefficient in a multidirectional sea, although such seas are common. Some design studies have been done on a two-dimensional flexural system, the Wave Carpet, designed to overcome this disadvantage. See "The Dynamics of Wave Carpet, A Novel Deep Water Wave Energy Design," Oceans 2003 Proceedings, vol. 4, pp. 2288-2293.1). The principal characteristic of flexural systems is their very large size, because to work efficiently, their length scale must be comparable to the wavelengths of ocean gravity waves. Also, because ocean wave height and length are related, it is difficult to dynamically tune such devices.

An oscillatory water column device is described in Jin-Ha Kim, et al., "An Experimental Study on the Reverse Wave Drift Force of a BBDB Type OWC Wave Energy Device," Proceedings of The Seventh (2006) ISOPE Pacific/Asia Offshore Mechanics Symposium, p. 237 and in http://www.gizmag.com/wave-power-owc/11122/. Resonant devices can be relatively small, but they require compromise between generation efficiency, which is highest in a narrow resonance band, and wave coupling efficiency, which demands a broad resonance to couple to broad wave spectra.

Other devices include angle rate/surge WEC devices such as a working mass WEC which develops less power per unit of deadweight mass, but can have all of its working parts sealed and not exposed to the marine environment, potentially lasting for several years without maintenance. Exemplary devices are described in U.S. Pat. No. 7,629,704. The devices include a heavy eccentric mass mounted on a vertical shaft. As the buoy pitches, rolls, and is pushed by surge motions, the mass responds inertially and rotates around the shaft, converting wave motion into rotational mechanical movement, and through a transmission to turn a generator. The device requires large working mass and is highly sensitive to chaotic inputs. A disadvantage of angle-rate and surge devices in general is that the power-to-mass ratio is relatively low.

In an exemplary non-resonant device, the differential motion of a spar and a broad float to move a magnet within a linear generator. Simplicity of design is an advantage, but disadvantages include: relatively low power-to-weight ratio; very large underwater profile, complicating deployment and repositioning; and relatively large above water protrusion, increasing its observability.

There is a need for small-scale, limited production, non-mooring WEC devices capable of supplying power to a wide range of applications, including, for example, all-electric UMVs.

SUMMARY OF THE INVENTION

In accordance with the foregoing objectives and others, the present invention provides a number WEC systems capable of providing electrical energy to power systems and/or to be stored for later usage. There systems described herein are light-weight, small-scale, easily transportable, non-mooring WEC systems capable of supplying power to a wide range of applications, including, for example, all-electric UMVs.

In one aspect of the invention, a water mass enclosure device for use in a body of water as part of a wave energy capture system that includes a surface float is provided. The water mass enclosure includes a collapsible, cylindrical housing extending from an opening at a top of the cylindrical housing to a substantially closed bottom of the cylindrical housing to define an inner chamber. The inner chamber is adapted to be filled with an amount of water upon submersion of the enclosure in the body of water, and the inner chamber typically has a defined shape when filled with the amount of water. Moreover, the housing substantially retains the defined shape when accelerated upwards by the vertical motion of the surface float under the influence of a gravity wave when the enclosure is placed into communication with the surface float, and does not collapse during a downward restoring motion of the surface float.

In another aspect of the invention, a water mass enclosure device for use in a body of water as part of a wave energy capture system that includes a surface float is provided. Typically, the water mass enclosure is made of two or more substantially solid plates connected by a flexible member such that a gap is defined between the plates. Water is entrained within the gaps upon submersion of the enclosure in the body of water. Moreover, the enclosure is collapsible such that the plates may be placed into contact with one another upon removing the enclosure from the body of water.

In yet another aspect of the invention, a water mass enclosure device for use in a body of water as part of a wave energy capture system that includes a surface float is provided. The water mass enclosure includes one or more concentric cone-shaped sections, which each have an opening at a top thereof and a substantially closed bottom. The cone-shaped sections each have an inner chamber adapted to be filled with an amount of water upon submersion of the enclosure in the body of water. Moreover, cone-shaped sections are attached to each other via a flexible member such that they may be collapsed into one another when removed from the body of water and extended a distance apart from each other when the enclosure is submersed in the body of water.

In another aspect of the invention, a system for producing electrical energy from kinetic energy contained in ocean gravity waves is provided. The system typically includes a water mass enclosure device, which may be optionally connected to a counterweight. The system also includes a generator, which is adapted to convert mechanical energy to electrical energy. The generator is directly or indirectly connected to the water mass enclosure device via a tethering means adapted to translate mechanical energy from the enclosure to the generator.

In yet another aspect of the invention a system for producing electrical energy from kinetic energy contained in ocean gravity waves is provided. The system typically includes a water mass enclosure device, which may be optionally connected to a counterweight. A lever arm is included in the system, and is in communication with the water mass enclosure device via a tethering means and further in communication with a hydraulic cylinder. The hydraulic cylinder includes a piston and hydraulic fluid and is in communication with a rotary hydraulic motor. The rotary hydraulic motor is further in communication with a generator adapted to convert mechanical energy of the hydraulic motor to electrical energy. Accordingly, the generator produces electrical energy with downward movement of the water mass enclosure device, as the lever forces hydraulic fluid through the rotary hydraulic motor via the hydraulic cylinder.

These and other aspects of the invention will be better understood by reading the following detailed description and appended claims.

BRIEF DESCRIPTION OF THE DRAWINGS

The preferred embodiments of the present invention are illustrated by way of example and are not limited to the following figures:

FIGS. 3(a) through 3(c) illustrate an exemplary water mass enclosure configuration with full diameter battens;

FIG. 10a through 10c illustrate various configurations for deployment of a water mass enclosure according to the invention;

FIGS. 11a and 11b illustrate an exemplary hydraulic system for use with one or more embodiments of the invention;

FIG. 12 illustrates graphically a situation where a counterweight is employed to hold a water-filled enclosure essentially vertical in the water and to provide a restorative acceleration during the negative-acceleration phase of the wave cycle;

DETAILED DESCRIPTION

Figure 1:
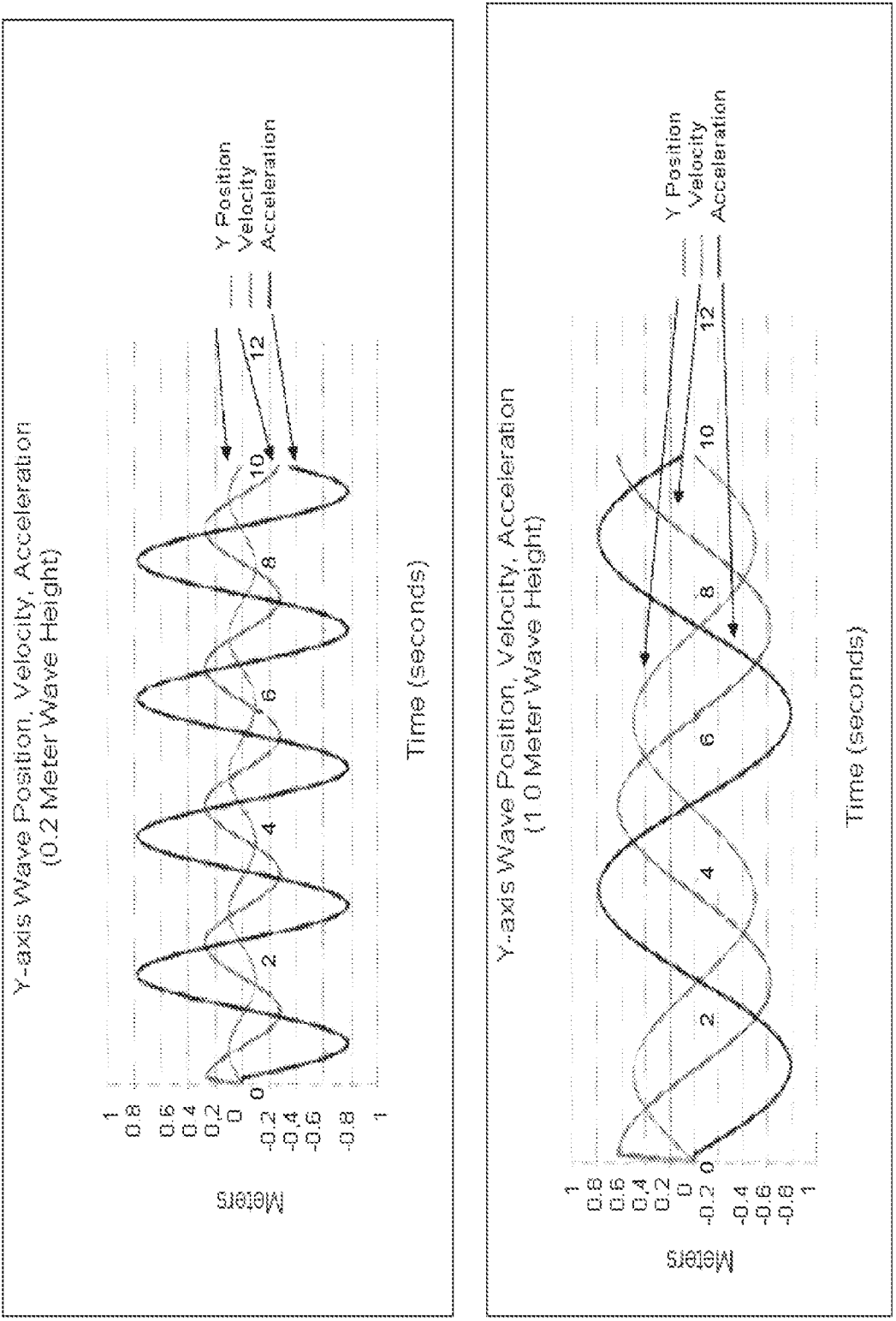
FIG. 1 illustrates time series for sinusoidal waves of two different heights.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided The WEC systems described herein will enable a wide variety of sensing, replenishment, and unmanned vehicle applications that have heretofore been impractical due to energy limitations. A key feature of the proposed system is a unique approach to coupling an electrical generator to the kinetic energy contained in ocean gravity waves. This coupling approach is enabled by the observation that the vertical acceleration created by waves is only weakly dependent upon wave height for fully developed seas. The systems can be scaled to meet almost any power requirement or anticipated wave environment, from a couple of watts to kilowatts. Exemplary systems may include power supply for near-shore installations such as depots and sensor nodes; recharging station for unmanned underwater vehicles (UUVs); self-recharging UUVs and high endurance drifting sensor platforms in full ocean depth water.

Because the WEC systems described herein employ water as a working mass (i.e., the source of reaction force), such mass does not need to be carried on board a host vessel. As a result, the system can beneficially employ a water mass enclosure made of a high tensile strength, collapsible material that can be compactly stored, deployed, and retrieved on demand. Exemplary systems described herein also include: (1) a hydraulic intermediary system that is ideally suited to extract energy from low speed reciprocating motion, and (2) a deployment/retrieval device that provides at least 10:1 volumetric efficiency for the stored state compared to the deployed state. The WEC systems described herein can provide wave-extracted energy in excess of platform needs; stabilize floating platforms; operate in severe weather; operate in either a moored or drifting configuration; and provide endurance that is not limited by energy considerations.

In certain embodiments, the results from wave energy extraction come from the synergy of the low-volume water mass enclosure, the retractability for ease of deployment, the efficiency of the hydraulic intermediate stage, and the nature of ocean gravity waves themselves. The WEC systems described herein may operate in a broad spectrum of wave conditions and, in certain exemplary embodiments, may potentially weigh less than about 120 lbs dry, and produce between 50 and 100 Watts. f course, much larger systems are within the scope of the invention. In any event, the WEC systems described herein typically demonstrate: (1) high efficiency; (2) retrievability; (3) compactness; (4) robust design for the marine environment; (5) passive control that still efficiently adapts to sea surface conditions; (6) operability in either a moored or drifting configuration; and (7) a low profile surface expression.

Figure 2:
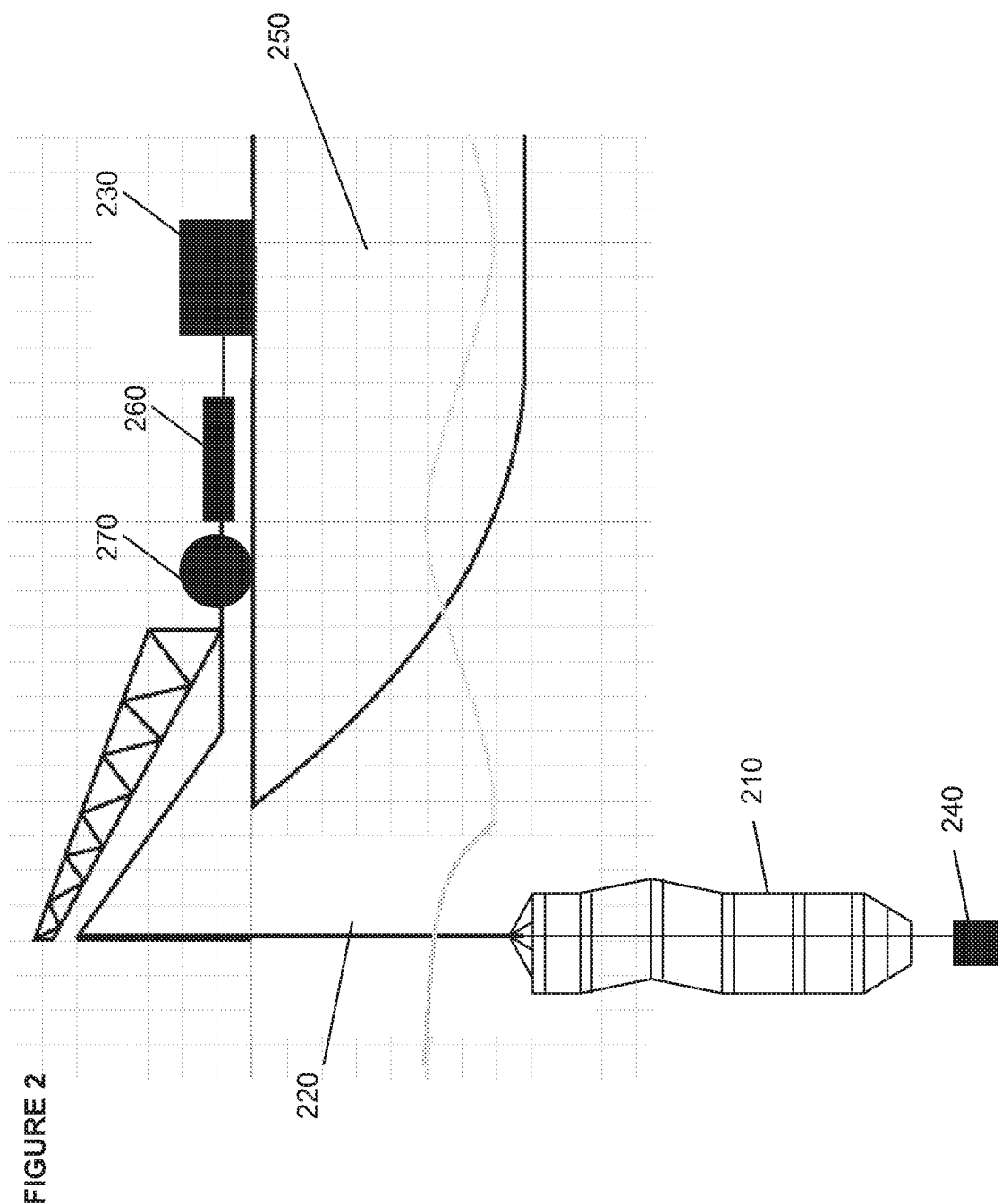
FIG. 2 illustrates an exemplary WEC system according to the invention.

Referring to FIG. 2, the systems described herein utilize a mass of water entrained in a collapsible water mass enclosure 210 that is suspended beneath a float (e.g., a vehicle, buoy, platform, etc.) 250 to provide an inertial force in opposition to the rising heave-induced acceleration of the float. The water mass enclosure 210 is communication with a generator 230, such as by tethering one end of a tethering means 220 to the generator and the other to the enclosure. It will be appreciated that the enclosure 210 may be connected, attached, coupled, tied, tethered or otherwise placed in communication with a generator 230 via any number of tethering means such as but not limited to ropes, cables, wires, chains, rods and/or other connective devices known in the art. Moreover, as discussed in detail below, the enclosure 210 may be placed in communication with an intermediary hydraulic system 260, which is also in communication with the generator 230. In certain embodiments, the system will include a reel system 270 for deploying and retrieving the water masse enclosure 210.

Because values of acceleration are predictable, the general approach of the WEC systems is to harness F=ma by employing a mass large enough to generate useful forces. The challenge is to obtain mass without adding dry weight to the system (i.e., without having to carry the mass on board the float), and without mooring. Fortunately, the ocean provides a ready and unlimited source of mass in the form of seawater. As an example, if a water mass enclosure 210 is filled with 1 m³ of seawater (a mass of 1000 kg) and is entrained in a low-drag configuration, suspended beneath a float 250 that responds to the free surface, a peak force of 790 Newtons (180 lbs) would be expected during the power stroke (positive acceleration, through the trough) of a 1-meter, 5-second wave. The RMS force is 560 Newtons (130 lbs) over one half of the wave period. This cyclic force can be harnessed to perform useful mechanical work, similar in manner to a person operating a hand pump. If the tethering means 220 is allowed to pay out while controlling tension to be F=γma, (0<γ<1), a displacement of the enclosure 210 with respect to the float 250 will be s=(1−γ)h and the work done on an attached generator 230 will be W=γ(1−γ)mah. The function γ(1−γ) has a maximum value of 0.25 at γ=0.5. For the example of the previous paragraph, W=0.25*790*1=200 J, and for a 5-second wave, this represents an average power of 40 W.

The specific form of the water mass enclosure 210 may vary depending on the system in which it is used and the environment in which the enclosure is to be employed. For example, the water mass enclosure 210 may comprise a flexible housing defining an inner chamber and having an open end such that is may be filled with water when submerged. The flexible housing may comprise one or more apertures located along its length, including one or more apertures located towards the closed end of the housing, which allow for water to enter and/or exit the enclosure. The apertures may allow for faster filling of the enclosure 210 with water, although such filling could be additionally or alternatively accomplished via a valve, pump, or other method (not shown). In certain embodiments, the apertures may be in the form of one-way gill-like holes periodically placed along the length of the enclosure 210. As the water mass enclosure 210 is pulled upwards, the "gills" would take on forced water in-feed, whose outflow is not matched by the size and flow rate of holes located at the bottom, which also serve as drains when the enclosure is retrieved. If necessary a means of dewatering the enclosure during retrieval may also be employed.

The flexible housing may be constructed of a durable, high tensile material, such as but not limited to aramid fiber or Kevlar. Moreover, a water mass enclosure 210 may also have anti-fouling characteristics, whether intrinsic to its materials or as a surface treatment (e.g. copper sulfate). By way of example, a water mass enclosure may be constructed of a suitable low-porosity (but not necessarily watertight) material, which has enough strength in tension so that it does not bulge or deform appreciably when accelerated upwards by the vertical motion of the surface float, nor collapse during the downward restoring motion.

In certain embodiments, a deadweight mass ("counterweight") 240 may be attached to the water mass enclosure 210 such that, during a wave's negative acceleration phase (over the crest), the water-filled enclosure 210 falls passively under the influence of its bottom-mounted counterweight. See, e.g., FIG. 12. The mass of the counterweight 240 is such that it is only enough needed to help the water mass enclosure 210 reach nearly full recovery during the down stroke. The counterweight 240 should have a submerged deadweight mass sufficient to accelerate the enclosure 210 downwards at 0.5 m/s² or whatever value is consistent with the power output requirement and expected seas encountered. In certain embodiments, the counterweight 240 has a mass equal to about 5% of the mass of the entrained water (e.g., 50 kg for a 1000 liter enclosure). The counterweight 240 could be made of steel, pot metal, or some other low-cost metal (concrete would also serve but would have a somewhat higher volume). To prevent corrosion, the weight can be embedded in a thick skin of plastic or silicone.

In certain embodiments, a flexible water mass enclosure 210 may be made such that it can be rolled, folded, or otherwise stuffed into a relatively small volume for storage. As it is unfurled into the water, the counterweight 240 on its bottom end pulls the water-filled enclosure 210 down, causing it to hang vertically beneath the float 250. The enclosure 210 must be capable of filling and draining as required, supporting its bottom counterweight 240 under constant and dynamic tensile loads, and of course be strong enough to handle loads imposed on it without tearing.

The unfurled, filled volume of the enclosure 210 determines the amount of water, and therefore the reaction mass. The overall dimensions of the enclosure 210 will be sufficient to contain this volume of water. Moreover, although the enclosure 210 will be generally cylindrical in shape, there is a range of aspect ratios (height/diameter) that have the same volume, and the enclosure is not limited to a particular aspect ratio. In addition, it may be desirable to have a slight taper to the enclosure 210, such that the housing becomes narrower at the bottom, as this may facilitate deployment and retraction.

Fundamentally, the float 250 for carrying the system components must provide sufficient reserve buoyancy for the water mass to react against. It must also provide the necessary robustness for survival in significant seas. Although the water mass enclosure 210 is typically designed such that it is naturally self-righting due to the keelward force of the tethering means, appropriate float shape, component mounting, and installed buoyancy will contribute to the robustness.

Resonance of the float/water mass system must be avoided. A weighted floating body acts like a spring when it is displaced. The spring constant is determined by the change in buoyant force per change in vertical displacement (the buoyancy coefficient). Assuming a nstant buoyancy coefficient (right prismatic shape), $$mv'' = k\Delta v = (\rho_{sw} \rho_{float}) g A \Delta v$$

Where A is the horizontal float area.

The natural period of the float-weight system is $$T = 2\pi \sqrt{\frac{m}{(\rho_{sw} - \rho_{float}) g A}}$$

As an example, a system may have a total mass of 1,000 kg, a float density 0.1 times that of seawater, and a horizontal area of 1 square meter. The natural period of this system would be 2.08 seconds, which is unacceptably long. This period is comparable to some encountered wave frequencies, and the system could thus experience large oscillations. These could increase stresses, and reduce efficiency if they become out of phase with the waves. By increasing the float area, for example, to 4 square meters, the natural period is reduced to 1.04 seconds, and oscillations will be small.

Other techniques to minimize oscillations could also be used, but could add system complexity.

Referring to FIGS. 3a-3c, an exemplary water mass enclosure 310 may comprise one or more stiff, full diameter battens 311 placed within the inner chamber of the enclosure, along its length. The battens 311 add rigidity and stability to the enclosure 310, but can still allow some horizontal play during retraction (see FIGS. 3b and 3c). Excess horizontal play can create problems in maintaining vertical alignment during retraction, because the water mass enclosure 310 can spread out to a diameter of approximately 2 times its diameter in a true vertical state, making it difficult to handle. (See progression of spread in FIGS. 3a through 3c).

Figure 4C:
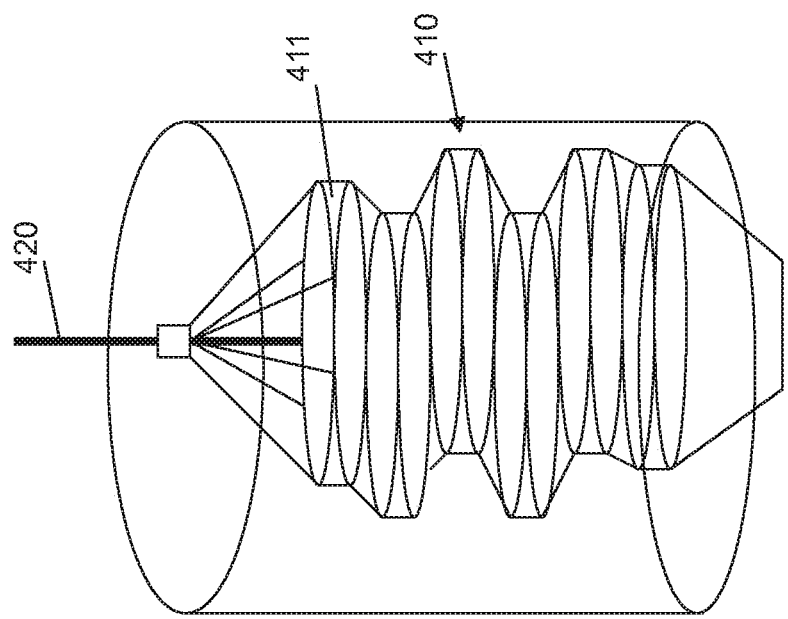
FIGS. 4(a) through 4(c) illustrate an exemplary water mass enclosure configuration having concentric dual battens in place to minimize horizontal movement during retraction.
Figure 4B:
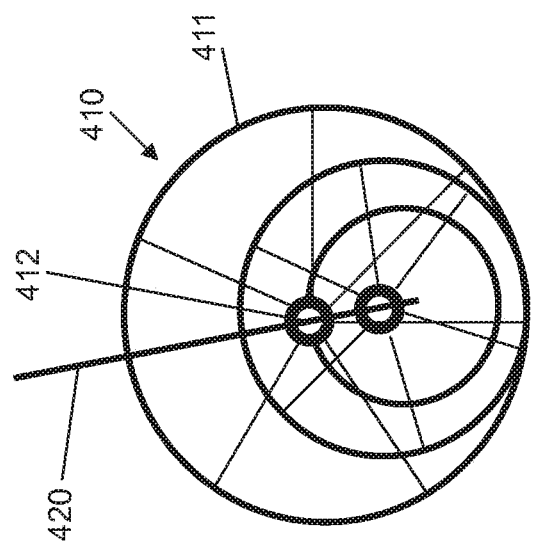
Figure 4A:
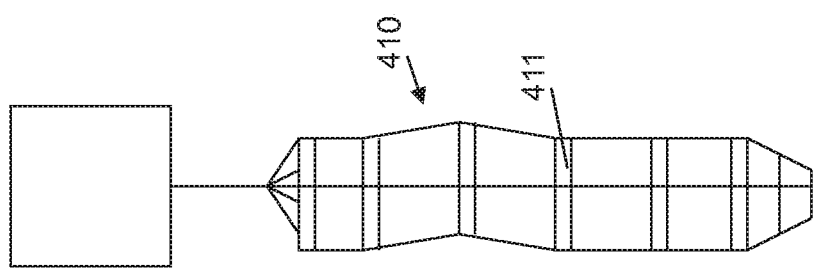

Referring to FIGS. 4a-4c, an alternative embodiment is illustrated wherein the battens are constructed such that there is a small-diameter batten 412 (i.e., less than the diameter of the enclosure) concentric to a large-diameter batten 411 (i.e., the same diameter as the housing). The small-diameter batten 412 may be attached to the large diameter batten 411 in such a way as prevent substantial horizontal movement of the small-diameter batten (e.g., via a rope, string, chain, rigid structure, or the like). Generally, the tethering means 420 may run through the small battens 412 toward the bottom of the water mass enclosure 410, reducing the side-to-side movement of the tethering means during retraction of the enclosure. As compared to FIGS. 3a-3c, this batten design creates additional radial stabilization (see e.g., FIG. 4b), which reduces horizontal play and facilitates retraction of the enclosure 410.

Figure 5:
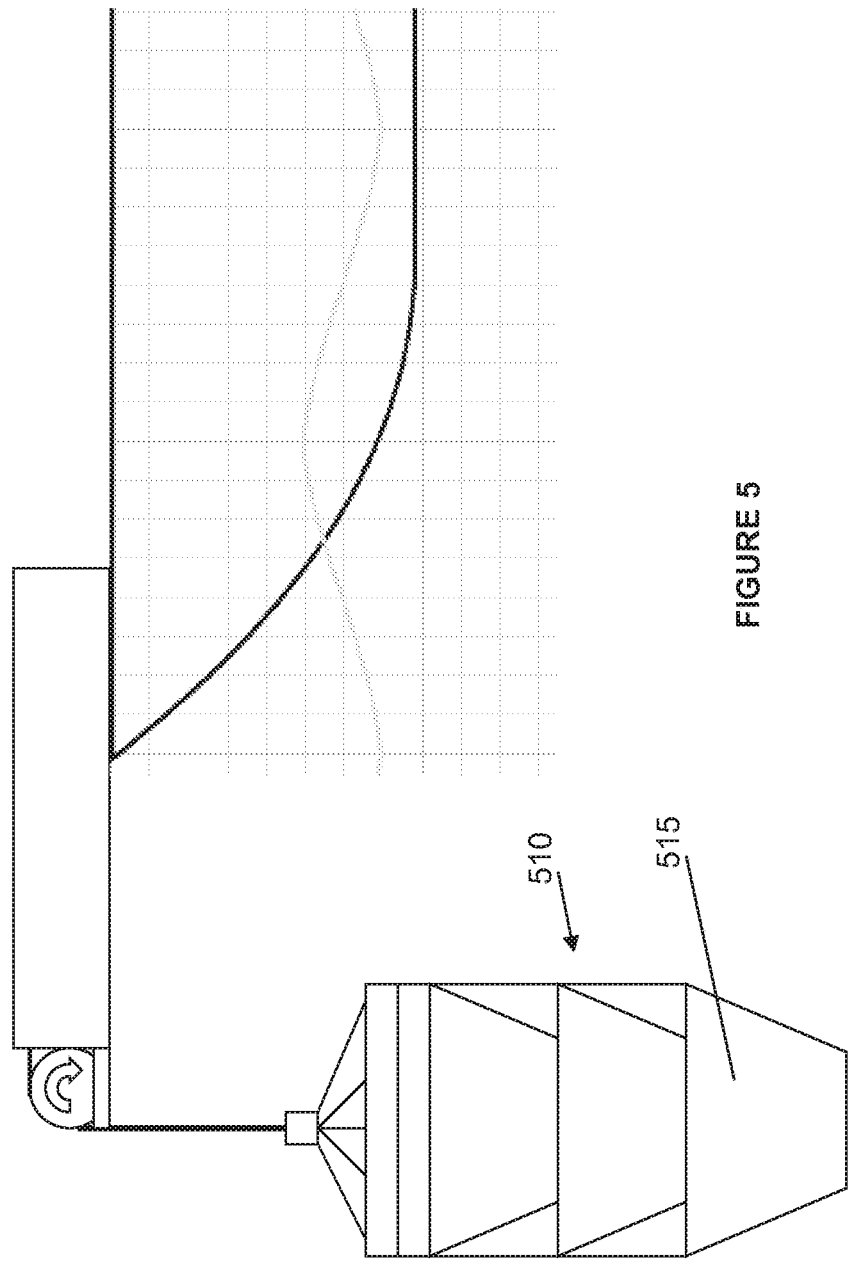
FIG. 5 illustrates a segmented, non-rigid water mass enclosure with stackable cone segments.

Referring to FIG. 5, an exemplary water mass enclosure 510 is illustrated as being segmented and non-rigid, and wherein the individual fabric segments are conical shaped. As the enclosure is reeled in, the cones 515 dewater and stack one into the other, significantly reducing the footprint and weight of the enclosure.

Figure 6:
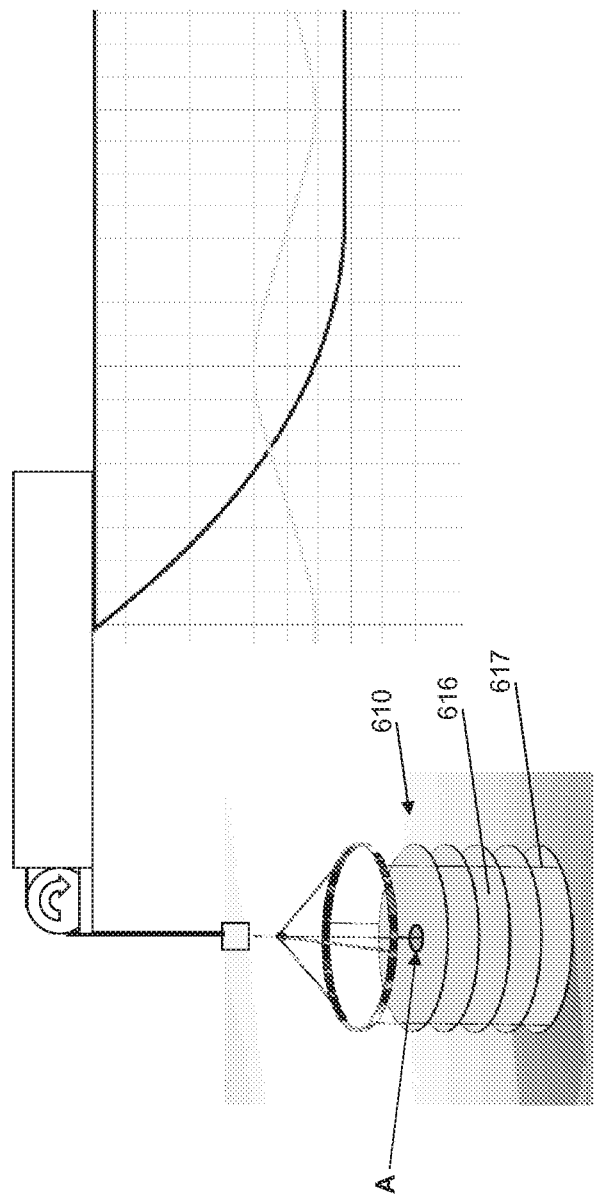
FIG. 6 illustrates an exemplary water mass enclosure comprising one or more connected plates.

Referring to FIG. 6, an exemplary water mass enclosure 610 is illustrated as one or more connected plates 616. The plates may be of any shape, such as an ellipse (e.g., circle or oval) or non-elliptical shape (e.g., rectangle, triangle, hexagon, etc.), and may be made from any material (e.g., plastics or metals). The number, size and thickness of the plates 616 will be determined by a number of factors, including the weight of the material and the desired and/or required amount of energy to be produced. To this effect, the plates 616 may be substantially solid, although it is possible that the plates may comprise a number of apertures. Although the plates 616 are typically connected by a flexible member 617 (e.g., a rope, string, chain, etc.), in other embodiments, the plates may be connected via a rigid pole or rod. The flexible member 617 may be connected to either the outside edge of each of the plates 616, or may run through an aperture through the body of the plate. The plates 616 are connected in such a way as to allow for a gap or distance between each of the plates when the flexible member 617 is fully extended, and this gap may be fixed or adjustable for optimization. Moreover, the plates 616 are connected as to allow the entire structure to be collapsed when retracted.

In operation, water is still entrained in spaces between the plates 616. The plates 616 moving vertically create a "virtual enclosure" or cylinder, and the entrainment of water is similar to an actual enclosed volume as described above. In the time scale of operation, water in the spaces may not be exchanged with surrounding water. This allows current to flow through the cylinder reducing lateral drag on the device. There are many advantages to this configuration, including complexity, price, strength, compactness, and resistance to current.

Figure 7:
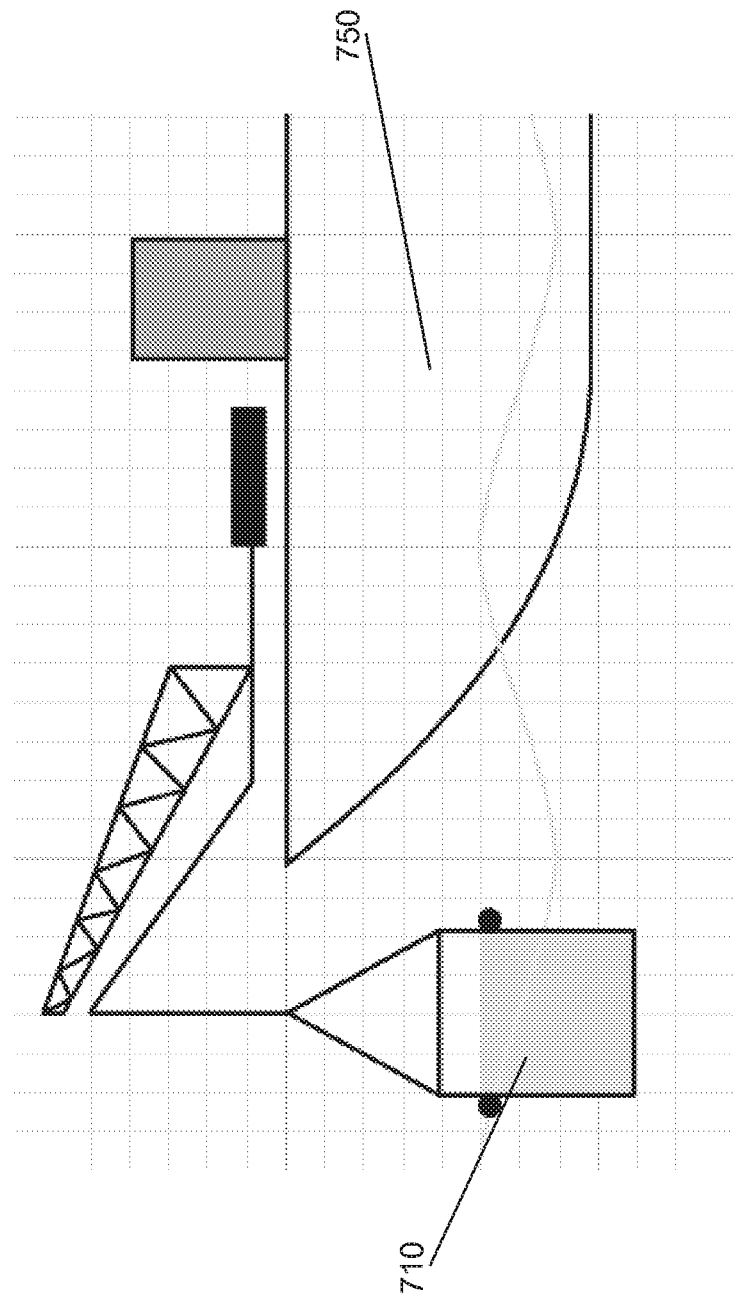
FIG. 7 illustrates an exemplary water mass enclosure comprising a rigid bucket.

Referring to FIG. 7, an exemplary water mass enclosure 710 is illustrated in the form of a rigid container (i.e., a bucket). As shown, this form factor could operate over the side of relatively larger float 750, such as a large ship, oil rig, dock or the like. The wave action of smaller waves on the bucket 710, which are not in phase with motion of the float 750, act to generate energy. As the wave falls away from the bucket 710, the full force of gravity acts upon the primary cylinder. When the wave rises, the bucket 710 becomes weightless again and rises with the wave for next cycle. This configuration offers a very high power to mass ratio and the bucket 710 does not require significant counterweight ballast (and in some cases no counterweight ballast) as discussed with respect to prior embodiments. The configuration can be handled by single person (for manned operations). The dewatering of the bucket 710 is typically by means of a bottom line (discussed below in reference to FIGS. 10a-10c). Although shown as a rigid cylindrical bucket, the bucket may alternatively comprise a conical shape.

Figure 8A:
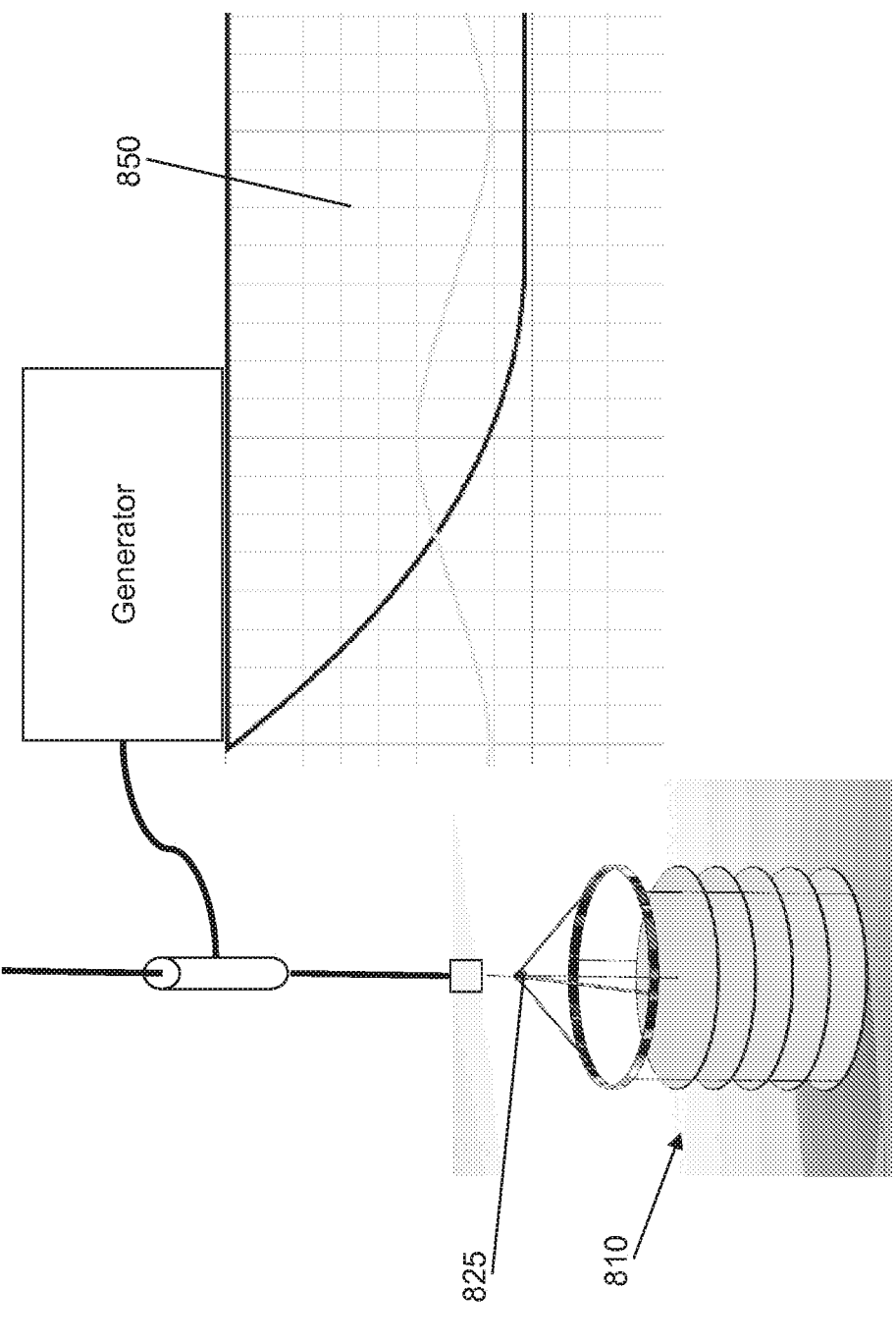
FIGS. 8a and 8b illustrate exemplary methods of deploying a water mass enclosure according to the invention.
Figure 8B:
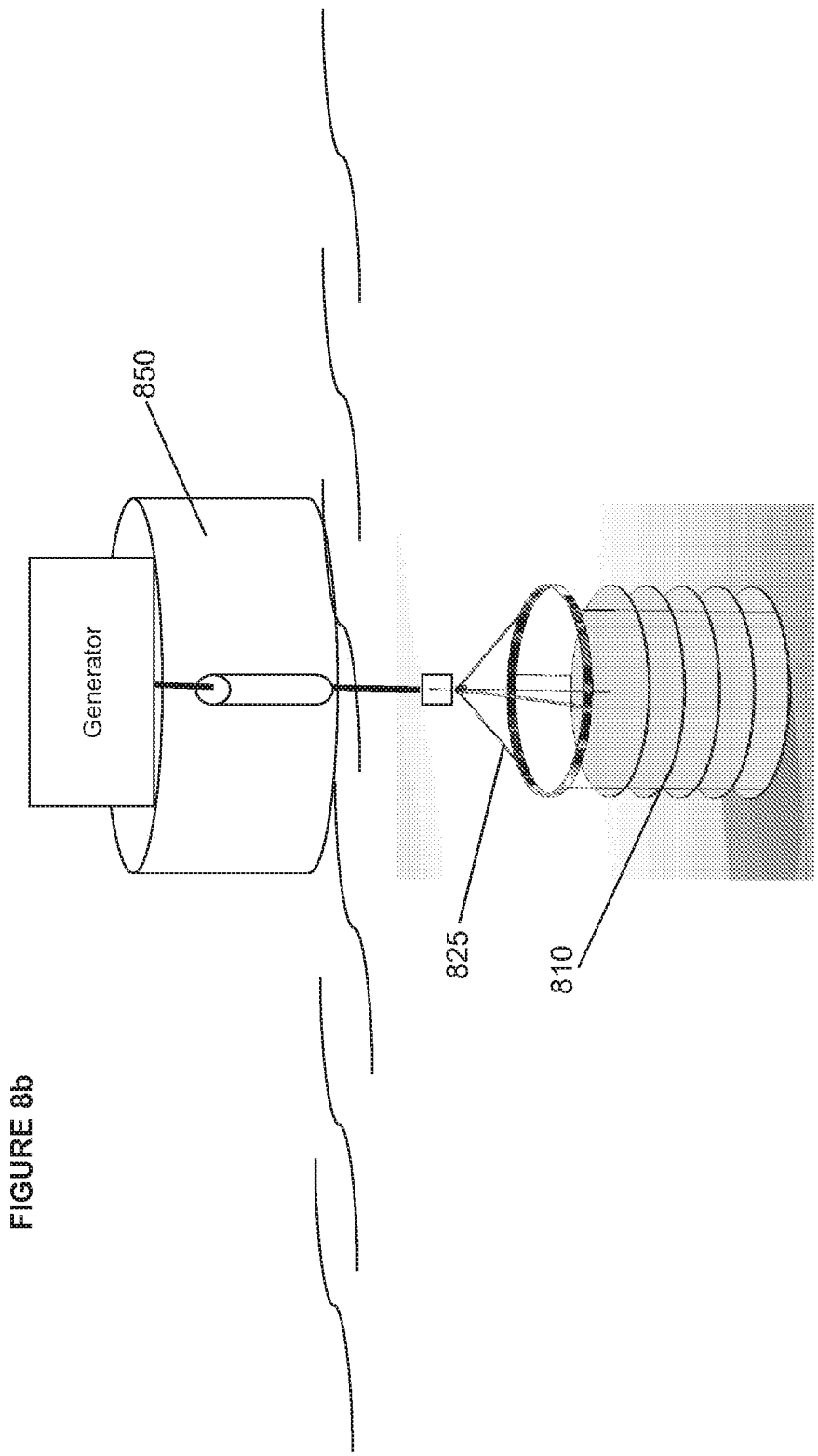

Referring to FIGS. 8a and 8b, there are numerous deployment options for the water mass enclosures 810 described herein. For example, a provision may be made for stowage, deployment, and retrieval of a water mass enclosure 810 aboard a floating vessel 850. The top of the enclosure 810 could be connected to a short leader of heavy strap 825, which is in turn fastened in a robust manner to the hub of a reel (not shown), much like a garden hose caddy. In certain embodiments, the water mass enclosure 810 may be deployed over the side of a float 850 (FIG. 8a) or may be deployed through a slot or hole in the bottom of the vessel (FIG. 8b). In the bottom-deployment configuration (FIG. 8b), any employed counterweight (not shown) fits snugly up against the bottom of the hull of the float 850 when the enclosure 810 is fully reeled in. This both simplifies the initiation of deployment and limits the amount of seawater intrusion into the float's internal bay.

Figure 9B:
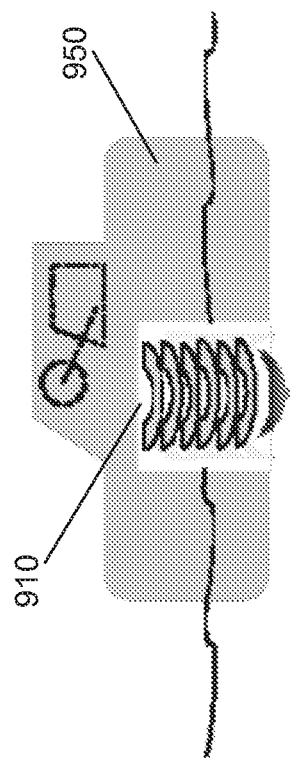
FIGS. 9a and 9b illustrate a segmented non-rigid water mass enclosure in a deployed state (9a) and stowed state (9b)
Figure 9A:
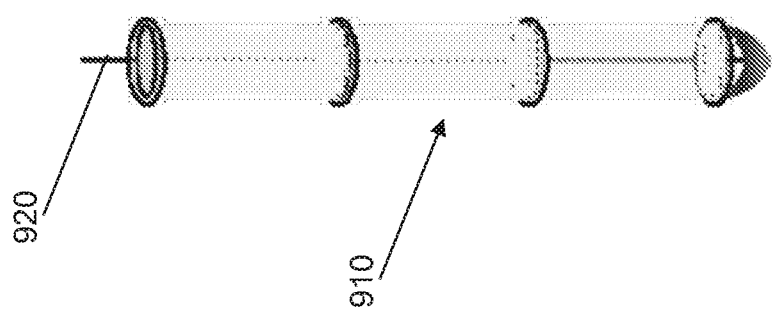

A bottom-deployment configuration is shown in more detail in FIGS. 9a-9b. In the illustrated embodiment, a one-piece, reelable, non-rigid, collapsible water-mass enclosure 910 may be used, wherein a reelable rope or chain 920 is attached to at least one end thereof and can be retracted. The rope or chain 920 is retracted onto a reel (not shown) and the water mass enclosure 910, after dewatering, may be stowed in a well beneath the platform 950 or brought up onto the platform. In a more specific embodiment, the non-rigid water mass enclosure 910 is formed as a multi-segment unit with stiffened segment spacers as shown in FIG. 9a.

Referring to FIGS. 10a-10c, a water mass enclosure 1010 may deployed and stored in a horizontal position (rather than a vertical position) as shown as shown in FIGS. 10a-10c. The enclosure 1010 may have a line 1018 attached to the bottom end thereof, such that the line may be tensioned to move the enclosure from a horizontal to vertical position and vice versa. The enclosure 1010, may be deployed horizontally as shown in FIG. 10c from a horizontal storage position and is ideal for operation in shallow depths and can be operated while under way or station keeping.

Referring to FIGS. 11a and 11b, the water mass enclosure may be attached via a tethering means to a swing arm 1135 similar to a hand pump. Between the legs of the swing arm, one or more hydraulic pistons 1136 and opposing springs are attached. In essence, the system operates like a hand-operated pump, with the water mass and return spring working together to move the pump's lever 1135. On a wave's up stroke (which occurs through the trough), the forces pulling on the enclosure are imparted through the reel to the swing arm 1135, causing the piston 1136 to be compressed. The piston's 1136 motion forces hydraulic fluid in a closed-loop system that contains various hydraulic valves and accumulators, where stored pressure will be used to drive a hydraulic motor. The pressure will build up into the working range on initial deployment, then attain a steady state as power is provided to the loads. See FIG. 12.

A hydraulic generator system is proposed due to reliability, efficiency and relatively low cost. Other generator systems involving low speed (high magnetic flux) generators, fly wheels, etc. may also be considered. The hydraulic motor can perform direct mechanical work and/or be used to spin a generator or alternator to make electricity. The electricity can be stored in a battery or used directly by a circuit.

The spring tension on the swing arm assembly is constructed and adjusted so that it properly pushes the hydraulic drive piston 1136 to its "ready" position for the next wave up stroke and will exactly balance the counterweight's downward force. To retrieve the water mass enclosure, the reel mechanism is slowly rotated to bring the enclosure back on board and simultaneously wring out its water content. As the enclosure is reeled in, its entrained water flows out through its drain holes. Thus, the mass of the enclosure, when stowed, is many times less than when deployed and fully filled with entrained water.

As an example, a table-sized float might have a total buoyancy volume of 2 cubic meters and weigh 500 kg when out of the water (a density of 0.25). The downward force of gravity on an object at the earth's surface is 9.8 Newtons per kilogram, or 4900 N on the float. The vessel is capable of floating as long as the downwards forces on it do not exceed 19,600 N. The reserve displacement of vessel is then 14,700 N. This means that in addition to its own weight, an additional 14,700 N of downward force (1.5 tons) would be required in order to make the vessel neutrally buoyant. The addition of more downwards force would cause the vessel to sink. Earlier we determined that the vertical acceleration of ocean waves could be 4.4 m/s2 for steep, nearly breaking waves. The maximum entrained mass that could be utilized by this exemplary float is m=F/a=14,700/4.4=3,340 kg (or a control system could be implemented to limit the downward force on the float to a safe value).

As another example, a smaller float and water mass enclosure may also be employed. With a float volume of 0.5 cubic meters and a density of 0.25, the reserve buoyancy will be 3,675 N. With an entrained volume in the enclosure of 0.5 cubic meters, work per cycle in h/L=1/10 waves will be 0.25*500*3.1 h=390*h J. The power output for various waves of the same shape is shown in Table 1, with the additional constraint of limited payout of the tethering line.

TABLE 1

| Period T (sec) | Wavelength L (m) | Height = L/10 (m) | Peak Force (N) | Work per cycle = 390 H (J) | Power = W/T (Watts) |
|---|---|---|---|---|---|
| 1.5 | 3.5 | 0.4 | 1,540 | 140 | 90 |
| 3 | 14 | 1.4 | 1,540 | 310 | 100 |
| 4.5 | 32 | 3.2 | 1,540 | 310 | 70 |

The bottom row of Table 1 shows the power-limiting consequence of restricting the total travel of the arm to 0.4 meter for system compactness. Over a 12-hour charging period, which is consistent with one use of this device, the energy produced would be 840 to 1,200 Watt-hours.

Figure 13:
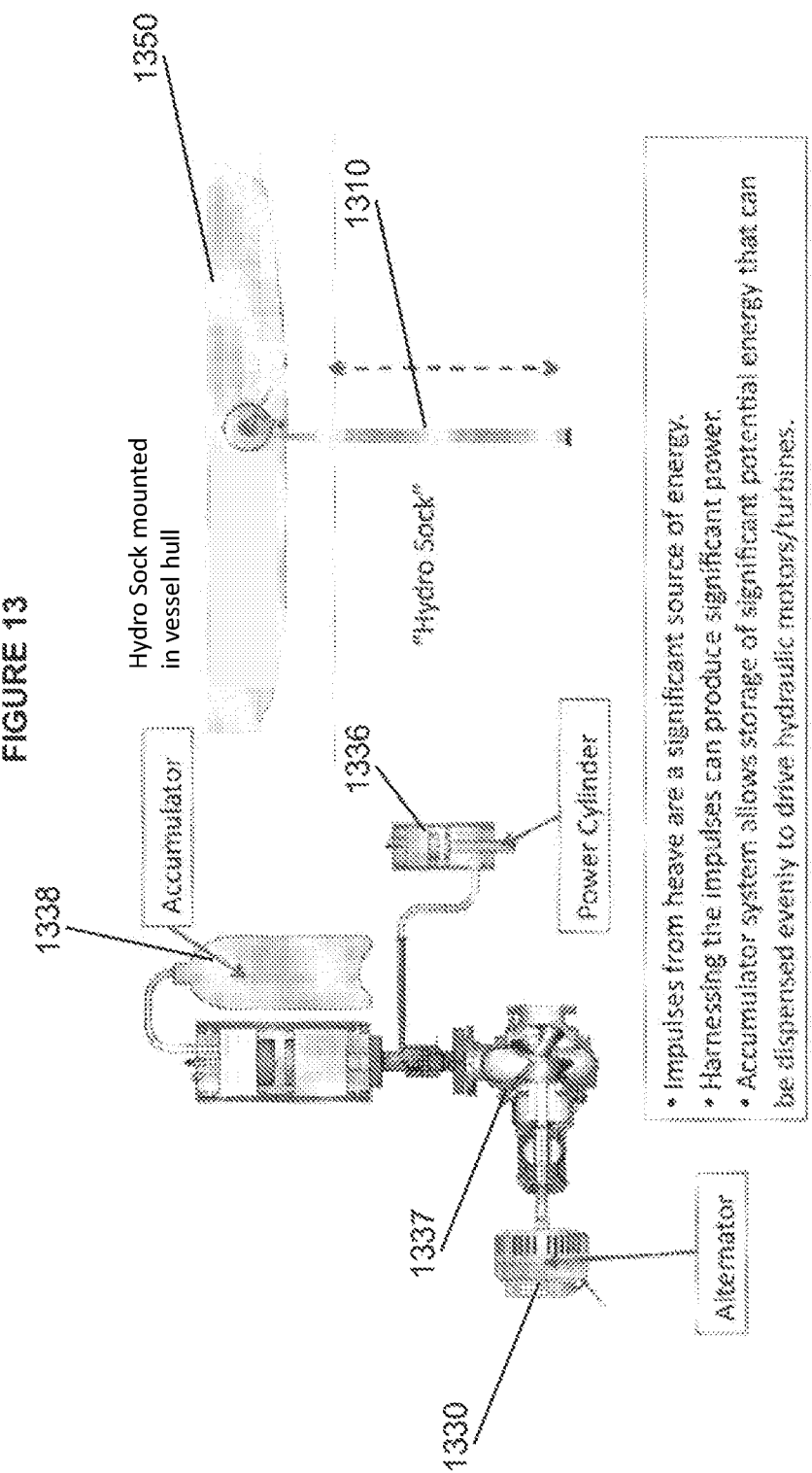
FIG. 13 illustrates an exemplary mounting configuration and a power system configuration for use with one or more embodiments.
Figure 15:
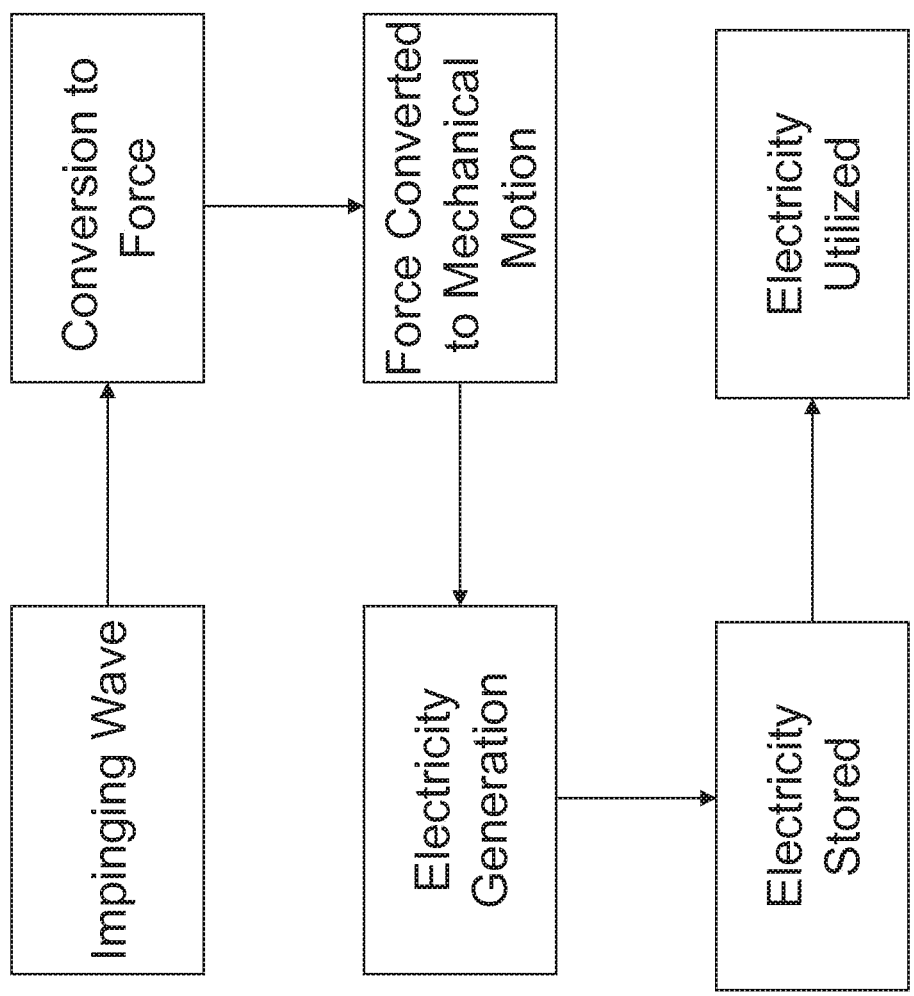
FIG. 15 illustrates a wave energy conversion process enabled by the embodiments described herein.

Referring to FIG. 13, the WEC systems described herein act to convert the forces generated by the suspended water-filled enclosure into electrical power for use in real time and for storage. See also FIG. 15. In order to best accomplish this, with large forces at play and a short linear stroke distance, hydraulics are typically employed. In one exemplary embodiment, the enclosure 1310 is suspended from the end of a lever arm, which essentially acts as a pump handle. See, e.g., FIGS. 11a and 11b at 1135. The lever arm is connected to one or more hydraulic cylinders 1336 and a return spring. When the lever is moved, the pistons force hydraulic fluid through a rotary hydraulic motor 1337. The motor 1337 turns an electrical alternator or generator 1330, and the electrical output is used to power equipment and charge batteries. The range of accelerations depends on the shape of waves being encountered, with long swells having lower accelerations and steep chop having the higher values.

Knowing the design acceleration, the forces, power levels, and dimensional requirements may be derived. In an exemplary embodiment, a maximum water mass travel of 0.4 m, based on a hydraulic stroke of 0.3 m, yields a power output of 90-100 Watts in 2-4 foot seas (with an entrained water mass in the water mass enclosure of 500 kg). The exemplary device has dimensions of 18 inches high, 2 feet wide, and 3 feet long. The device houses the enclosure, retraction reel, hydraulic components, fluid reservoirs, and the motor-generator.

A higher power, 170-Watt unit can be constructed by increasing the entrained water mass to approximately 1000 liters, or 1 cubic meter. The submerged counterweight should be about 5% of the entrained water mass, or about 50 kg.

In certain embodiments, the system may produce electrical power to charge a battery (or bank of batteries). An average output level of 50-100 Watts (after losses) is satisfactory. One skilled in the art recognizes that the final rated power output will be determined by the combination of off-the-shelf components and size/weight considerations.

In general, the water mass for the enclosure for a 100-Watt device may be about 1000 kg (approx. 1 ton) and 500 kg (0.5 tons) for a 50-Watt device. These values are post-battery, based on expected losses of 25% in the hydraulic transmission system and 40% for charging the battery, yielding an overall efficiency level of about 40-45%.

When deployed in 2-4 foot seas, the water mass enclosure 1310 will experience static and dynamic axial loads associated with vertical acceleration (wave heave) and lateral acceleration (particularly when the float is impacted by breaking waves). Energy harvesting utilizes only the axial loads. Some torsion (twisting) load will likely occur as a result of rotation of the vessel and underwater currents. Torsion loads are expected to be minor and not to have an impact on energy harvesting. The more important consideration will be wear and tear effects of twisting on the connection components at the top of the enclosure. A swivel mechanism at the suspension point or exit point from the vessel 1350 may be required. The water mass enclosure 1310 may also encounter undersea obstructions or debris. Dynamic loads consist of those resulting from acceleration and velocity buildup. Sudden surges from breaking waves may have acceleration rates of 30 m/s$^2$ but for only a few milliseconds at a time. Some of this force will be absorbed by the hydraulic system's accumulator 1338 that will also function as a shock absorber, and be bled at a measured rate to the generator. However, it might be possible for the device to encounter such a force when the device has reached its full range of motion (end of stroke). It may be necessary to include a small degree of backup elasticity in the mechanical system or in the tethering means to buffer such loads. Natural elasticity in the enclosure itself might come into play during these moments.

The purpose of the hydraulic system is to convert large forces acting over short distances into rotating mechanical force at speed and torque levels optimal for power generation via alternators. Referring again to FIGS. 11a, 11b, and 13, an exemplary hydraulic system may include a drive cylinder 1336 attached to a lever and frame. During the downstroke of the lever arm, this cylinder will pump hydraulic fluid under pressure. An exemplary cylinder 1336 may be from 2-4 inches in diameter, with a total stroke of 12 inches, and a working pressure in the range 400-3000 psi. One skilled in the art recognize the variations in this size configuration that are possible.

The hydraulic system will typically include a hydraulic accumulator 1338 downstream of the drive cylinder. The hydraulic accumulator acts to store energy in the form of internal pressure and smoothes the pulses of wave power into a more steady flow to the hydraulic motor 1337. The motor 1337 spins at from about 500-2000 RPM and includes a shaft-coupled to an alternator.

Valves of various types will operate to passively control the flow of hydraulic fluid at appropriate points in the hydraulic circuit. One or more valves will open when the pressure in the accumulator 1338 reaches a certain point, allowing pressurized fluid to flow via a flow control valve to the hydraulic motor 1337. Once the system reaches a steady state, the motor 1337 will spin continuously so long as the pressure in the accumulator 1338 remains above the minimum cutoff point. However, as pressure levels change in the system as a result of continued pumping by wave action, the motor itself will spin at various rates, from about 500-2000 RPM. It should be noted that the system will self compensate as the rate of spin increases, so will voltage on the generator 1330, which creates power through the load proportional to the square of the change in spin. Thus, doubling the spin rate would require a fourfold increase in power. When operating under a load, such as charging batteries or operating through a constant load, the motor's speed will be governed by the increasing load on it, i.e., smoothed greatly from what it would be if not under load.

The system will typically further comprise a fluid reservoir that is sized according to standard conventions for hydraulic systems. The reservoir will typically be located between the motor and the input side of the pump (piston).

A heat exchanger may be needed to regulate the temperature of the hydraulic fluid. Passive temperature-actuated valves may be used to shunt flow through the heat exchanger. Hydraulic fluid might also be routed through tubing around the generator to carry away excess heat, thus enabling a small dry-box volume.

Figure 14:
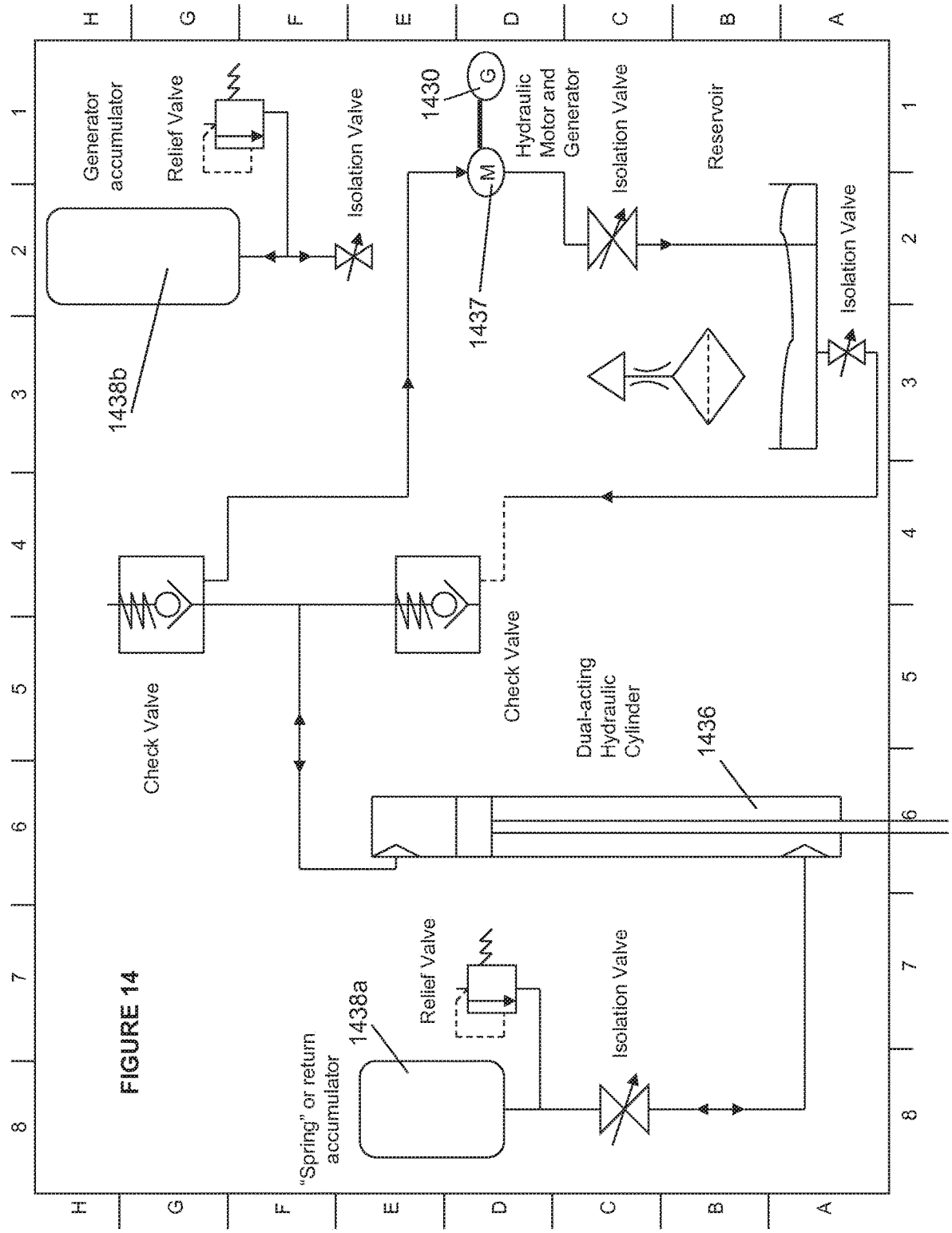
FIG. 14 illustrates power generation configuration.

Another exemplary hydraulic system or power pack is illustrated in FIG. 14 and includes a double-action "primary" cylinder 1436 in direct drive tension drive with the water mass. The system also includes two accumulators—a first accumulator 1438a provides "spring" pressure to one side of the primary cylinder and a second accumulator 1438b is pressurized by recoil action in between water mass pulses. Additionally, the system includes sequence valve controls, which cut-in and cut-out pressures for flow to a hydraulic motor to spin an electric generator (e.g., permanent magnet alternators). The power pack can handle a range of water mass enclosure sizes and shapes, as well as cylinders of different power ranges, making it suitable to a wider range of applications.

The electrical generator 1430 is capable of providing the rated average output power with peak loads of several times that, without overheating. An exemplary generator 1430 used with the present embodiments are permanent magnet alternators (PMAs). More specifically, see the embodiments described in U.S. patent application Ser. No. 12/778,586, titled RADIAL FLUX PERMANENT MAGNET ALTERNATOR WITH DIELECTRIC STATOR BLOCK, which is incorporated herein by reference. In a specific implementation, the alternator/generator 1430 operates with optimal output at rotating speeds from 500 to 2000 RPM for outputs of 50-500 Watts (instantaneous output) and is shaft-coupled to the hydraulic motor.

Electrical output from the alternator 1430 passes through full-wave rectifiers (3-phase) to convert the AC to DC current. The generator 1430 and hydraulic motor 1437 may be enclosed in a "dry box" section of the device, with sealed pass-through hydraulic hose and electrical connections. This will prolong the lifetime of these components. The hydraulic and generator system may operate in a fixed passive mode or alternatively, may include adaptive controls to optimize output for existing wave conditions.

The invention described and claimed herein is not to be limited in scope by the specific embodiments herein disclosed since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

We claim:

1. A wave energy capture system comprising:
a water mass enclosure device for use in a body of water including a surface float, the water mass enclosure comprising a rigid bucket for holding water therein, wherein responsive to wave action, at least part of the rigid bucket is exposed out of the water while holding water therein; and
a hydraulic subsystem located on the surface float and in communication with the water mass enclosure, the hydraulic subsystem including:
a lever arm in communication with the water mass enclosure device suspended therefrom via a tethering means having some elasticity, including a swivel mechanism for reducing torsion load, and further in communication with a hydraulic cylinder, the hydraulic cylinder comprising a piston and hydraulic fluid;
a rotary hydraulic motor in communication with the hydraulic cylinder and further in communication with a generator adapted to convert mechanical energy of the hydraulic motor to electrical energy;
wherein the rigid bucket is moved by waves in the body of water which are not in phase with motion of the surface float, wherein downward movement of the water mass enclosure device, including the rigid bucket, causes the lever to move, forcing hydraulic fluid through the rotary hydraulic motor via the hydraulic cylinder, thereby causing the generator to produce electrical energy.

2. The wave energy capture system of claim 1, wherein the rigid bucket is conical in shape.

3. A wave energy capture system comprising:
a water mass enclosure device for use in a body of water including a surface float, the water mass enclosure comprising a rigid bucket conical in shape for holding water therein, wherein responsive to wave action, at least part of the rigid bucket is exposed out of the water while holding water therein; and a hydraulic subsystem located on the surface float in communication with the water mass enclosure;

wherein the rigid bucket is moved by waves in the body of water which are not in phase with motion of the surface float, such movement generating energy using the hydraulic subsystem; and wherein the hydraulic subsystem includes a lever arm in communication with the water mass enclosure device suspended therefrom via a tethering means having some elasticity, the tethering means including a swivel mechanism for reducing torsion load, and further in communication with a hydraulic cylinder, the hydraulic cylinder comprising a piston and hydraulic fluid, a rotary hydraulic motor in communication with the hydraulic cylinder and further in communication with a generator adapted to convert mechanical energy of the hydraulic motor to electrical energy, wherein downward movement of the water mass enclosure device causes the lever to move, forcing hydraulic fluid through the rotary hydraulic motor via the hydraulic cylinder, thereby causing the generator to produce electrical energy.

* * * * *